United States Patent
Young et al.

(10) Patent No.: US 11,622,163 B2
(45) Date of Patent: Apr. 4, 2023

(54) SYSTEM AND METHOD FOR SYNCHRONIZING METADATA WITH AUDIOVISUAL CONTENT

(71) Applicant: LTN Global Communications Inc., Columbia, MD (US)

(72) Inventors: Alan David Young, North Bethesda, MD (US); Dimitri Felixovich Tarassenko, Peachtree Corners, GA (US); Roger James Franklin, Dawsonville, GA (US); Malik Khan, Bethesda, MD (US)

(73) Assignee: LTN Global Communications Inc., Columbia, MD (US)

(*) Notice: Subject to any disclaimer, the term of this patent is extended or adjusted under 35 U.S.C. 154(b) by 0 days.

(21) Appl. No.: 17/471,410

(22) Filed: Sep. 10, 2021

(65) Prior Publication Data

US 2021/0409840 A1    Dec. 30, 2021

Related U.S. Application Data

(63) Continuation of application No. 17/022,796, filed on Sep. 16, 2020, now Pat. No. 11,122,344, which is a
(Continued)

(51) Int. Cl.
| | |
|---|---|
| *H04N 21/8547* | (2011.01) |
| *H04N 21/235* | (2011.01) |
| *H04N 21/242* | (2011.01) |
| *H04N 21/81* | (2011.01) |
| *H04N 21/234* | (2011.01) |
| *H04N 21/236* | (2011.01) |

(Continued)

(52) U.S. Cl.
CPC ....... *H04N 21/8547* (2013.01); *H04N 21/233* (2013.01); *H04N 21/235* (2013.01); *H04N 21/23418* (2013.01); *H04N 21/23614* (2013.01); *H04N 21/242* (2013.01); *H04N 21/26603* (2013.01); *H04N 21/8133* (2013.01)

(58) Field of Classification Search
None
See application file for complete search history.

(56) References Cited

U.S. PATENT DOCUMENTS

2010/0070643 A1* 3/2010 Puranik .............. H04N 21/8547
                                                            707/E17.032
2020/0145706 A1* 5/2020 Jeffrey ................. H04N 21/237

* cited by examiner

*Primary Examiner* — Eileen M Adams
(74) *Attorney, Agent, or Firm* — Vector IP Law Group; Robert S. Babayi

(57) ABSTRACT

An example method comprises receiving, at a first digital device, video data, scanning video content of the video data for visual transitions within the video content between consecutive frames of the video data, each transition indicating significant visual transitions relative to other frames of the video data, timestamping each visual transition and create a first set of temporal video fingerprints, identifying items of metadata to be associated with the video data, identifying a location within the video data using the temporal video fingerprints for the identified items of metadata, generating a metadata index identifying each item of metadata and a location for each item of metadata relative to the video data using at least one of the temporal video fingerprints, and transmitting, at the first digital device, the video data, the first set of temporal video fingerprints, and the metadata index to a different digital device.

2 Claims, 14 Drawing Sheets

Related U.S. Application Data continuation-in-part of application No. 16/546,240, filed on Aug. 20, 2019, now Pat. No. 10,785,547, which is a continuation of application No. 15/900,665, filed on Feb. 20, 2018, now Pat. No. 10,390,109.

(60) Provisional application No. 62/568,975, filed on Oct. 6, 2017, provisional application No. 62/605,526, filed on Aug. 17, 2017.

(51) Int. Cl.
*H04N 21/266* (2011.01)
*H04N 21/233* (2011.01)

SYSTEM AND METHOD FOR SYNCHRONIZING METADATA WITH AUDIOVISUAL CONTENT

CROSS-REFERENCE TO RELATED APPLICATIONS

The present application is Continuation of U.S. patent application Ser. No. 17/022,796, which is a Continuation In-Part (CIP) of U.S. patent application Ser. No. 16/546,240, which is a continuation of U.S. patent application Ser. No. 15/900,665, filed Feb. 20, 2018 and entitled "System and Method for Synchronizing Metadata with Audiovisual Content" and claims priority to U.S. Provisional Patent Application Ser. No. 62/568,975, filed Oct. 6, 2017 and entitled "System and Method for Synchronizing Metadata with Audiovisual Content," and U.S. Provisional Patent Application Ser. No. 62/605,526, filed Aug. 17, 2017 and entitled "System and Method for Synchronizing Metadata with Audiovisual Content," all of which are incorporated by reference herein.

TECHNICAL FIELD

Embodiments of the present invention related generally to the synchronization of video and audio streams with metadata using out-band signaling.

BACKGROUND

Historically, in analog television broadcasting, the locations where commercials could be inserted was marked using in-band signaling such as dual-tone multi-frequency (DTMF) tones. DTMF tones can be used to indicate the start and stop times of commercials. These tones may be inserted by the broadcast or cable network and may be sent to local networks as part of a network feed. Subsequently, local television stations may insert or replace part of the network feed based on the DTMF tones with local content or commercials.

In digital television broadcasting, instead of using DTMF tones, in-band signaling (e.g., the Society of Cable Telecommunications Engineers (SCTE) 35 standard) is often used to signal the insertion of a commercial or other content. SCTE 35 metadata messages have long been used in the cable and broadcast industry to signal the start of local advertising breaks. The SCTE 35 Standard has evolved over the years through multiple revisions to also enable signaling and metadata for dynamic ad insertion, content replacement, blackout, start over, look back, DVR and live-to-VOD applications.

Metadata may include, for example, broadcaster-specific advertisements, location-specific advertisements, graphical overlays, tickers, timing of events within the video (e.g., a goal scored in a sports match), asset identification (e.g., Entertainment Identifier Registry (EIDR), Ad-ID) and/or the like. However, the SCTE 35 standard is ambiguous in many places with many sections completely optional and as a result there are multiple ways for the standard to be interpreted. This has resulted in a situation where many content providers that currently use SCTE 35 have different metadata configurations (still technically compliant with the SCTE 35 standard), even though the same temporal point or type of content is being signaled. For example, one content provider may signal the start of an advertising break using a particular type identifier, whereas another may choose to use a different type identifier where both type identifiers are perfectly valid according to SCTE 35. This causes confusion for distributors, especially those that are receiving content from multiple different content providers (e.g., multichannel video programming distributors ("MVPDs")).

Synchronization of this metadata with the video timeline is quite often lost as the audiovisual content is transmitted, processed and/or stored and as such the usefulness of the metadata degrades significantly. This causes events to be triggered at the wrong point in the content resulting in a poor on-screen experience for viewers. For example, if the SCTE 35 message that is signaling the start of a local advertising break at an MVPD arrives too early, the advertising insertion equipment will cut off the end of the previous program segment early. Similarly, if the SCTE 35 message arrives too late, there will be "peek through" of the programming that should have been replaced by a local commercial. These problems are hindering the ability for content providers and MVPDs alike to monetize content, especially as it relates to distribution of linear/live television via the internet.

Further, conversion between different viewing formats and/or transmission over different distribution channels may result in SCTE signaling and/or DTMF tones associated with the insertion of commercials and other visual graphics or audio components being lost. Metadata may be lost during the processing of audiovisual content, converting the audiovisual content from analog to digital (or vice versa), video encoding, video decoding, or changing the resolution of the video. In another example, SCTE signaling and/or metadata may be lost changing the frame rating to conform to a particular standard (e.g., high definition, ultra-high definition) or a particular regional requirement (e.g., PAL, NTSC, or the like).

SUMMARY

An example method comprises receiving, at a first digital device, video data, scanning, at the first digital device, video content of the video data for visual transitions within the video content between consecutive frames of the video data, each transition indicating significant visual transitions relative to other frames of the video data, retrieving, at the first digital device, a different time for each visual transition to timestamp each visual transition and create a first set of temporal video fingerprints, each of the first set of temporal video fingerprints being relative to a different visual transition and the retrieved time, identifying, at the first digital device, items of metadata to be associated with the video data, identifying, at the first digital device, a location within the video data using the temporal video fingerprints for the identified items of metadata, generating, at the first digital device, a metadata index identifying each item of metadata and a location for each item of metadata relative to the video data using at least one of the temporal video fingerprints, and transmitting, at the first digital device, the video data, the first set of temporal video fingerprints, and the metadata index to a different digital device.

Each of the temporal fingerprints may further identify a different frame associated with a visual transition.

In various embodiments, the method further comprises receiving, at a second digital device, the video data and the first set of temporal video fingerprints, scanning, at the second digital device, the video content of the video data for the visual transitions within the video content between consecutive frames of the video data, each transition indicating significant visual transitions relative to other frames of the video data, retrieving, at the second digital device, a different time for each visual transition to timestamp each visual transition and create a second set of temporal video fingerprints, each of the second set of temporal video fingerprints being relative to a different visual transition and the retrieved time, comparing, at the second digital device, the first set of temporal video fingerprints and the second set of temporal video fingerprints to determine a time offset and determine a timing difference, and inserting, at the second digital device, at least one of the items of metadata into the video data using the metadata index and the time offset to create modified video data.

The method may further comprise transmitting, at the second digital device, the modified video data to a user device for playback of the modified video data. In some embodiments, the method may further comprise the second digital device playing the modified video data.

In some embodiments, scanning, at the first digital device, the video content of the video data for visual transitions within the video content between consecutive frames of the video data, each transition indicating significant visual transitions relative to other frames of the video data, comprises calculating histograms STREAM=(h0, h1 . . . hn) for every chroma/luma/color channel where n is the number of possible pixel brightness levels for the particular channel and hi is the count of pixels with value i in each frame of video, calculating a sum of absolute differences (SAD) between histogram vectors of every pair of adjacent frames to generate resulting values, and comparing the resulting values to a threshold to identify at least one visual transition within the video content. The threshold may be a moving average of the SAD of histograms from previous frames with a sample window of double the video framerate.

In various embodiments, scanning, at the first digital device, the video content of the video data for visual transitions within the video content between consecutive frames of the video data, each transition indicating significant visual transitions relative to other frames of the video data, comprises decimating the histogram vectors STREAM (A) and STREAM(B) to the size of 16(H'(A)&H'(B)) as follows: where $$STREAM\ (A) = (a_0, a_1\ \ldots\ a_n); H'(A) = (h_0, h_1\ \ldots\ h_{15})\ h_i = \sum_{j=\frac{i(n+1)}{16}}^{\frac{(i+1)(n+1)}{16}-1} a_j$$

the result of this subtraction is used as a temporal video fingerprint.

Scanning, at the second digital device, the video content of the video data for visual transitions within the video content between consecutive frames of the video data, each transition indicating significant visual transitions relative to other frames of the video data, may comprise calculating histograms STREAM=(h0, h1 . . . hn) for every chroma/luma/color channel where n is the number of possible pixel brightness levels for the particular channel and hi is the count of pixels with value i in each frame of video, calculating a sum of absolute differences (SAD) between histogram vectors of every pair of adjacent frames to generate resulting values, and comparing the resulting values to a threshold to identify at least one visual transition within the video content.

In some embodiments, inserting, at the second digital device, at least one of the items of metadata into the video data using the metadata index and the time offset to create modified video data comprises adjusting audio of the video data.

An example system may include a first digital device including one or more first processors and memory, the memory containing instructions executable by at least one of the one or more first processors to: receive video data, scan video content of the video data for visual transitions within the video content between consecutive frames of the video data, each transition indicating significant visual transitions relative to other frames of the video data, retrieve a different time for each visual transition to timestamp each visual transition and create a first set of temporal video fingerprints, each of the first set of temporal video fingerprints being relative to a different visual transition and the retrieved time, identify items of metadata to be associated with the video data, identify a location within the video data using the temporal video fingerprints for the identified items of metadata, generate a metadata index identifying each item of metadata and a location for each item of the metadata relative to the video data using at least one of the temporal video fingerprints, and transmit the video data, the first set of temporal video fingerprints, and the metadata index to a different digital device.

In some embodiments, the system further comprises a second digital device including one or more second processors and memory, the memory containing instructions executable by at least one of the one or more second processors to: receive the video data and the first set of temporal video fingerprints, scan the video content of the video data for the visual transitions within the video content between consecutive frames of the video data, each transition indicating significant visual transitions relative to other frames of the video data, retrieve a different time for each visual transition to timestamp each visual transition and create a second set of temporal video fingerprints, each of the second set of temporal video fingerprints being relative to a different visual transition and the retrieved time, compare the first set of temporal video fingerprints and the second set of temporal video fingerprints to determine a time offset and determine a timing difference, and insert at least one of the items of metadata into the video data using the metadata index and the time offset to create modified video data.

DETAILED DESCRIPTION

Figure 1:
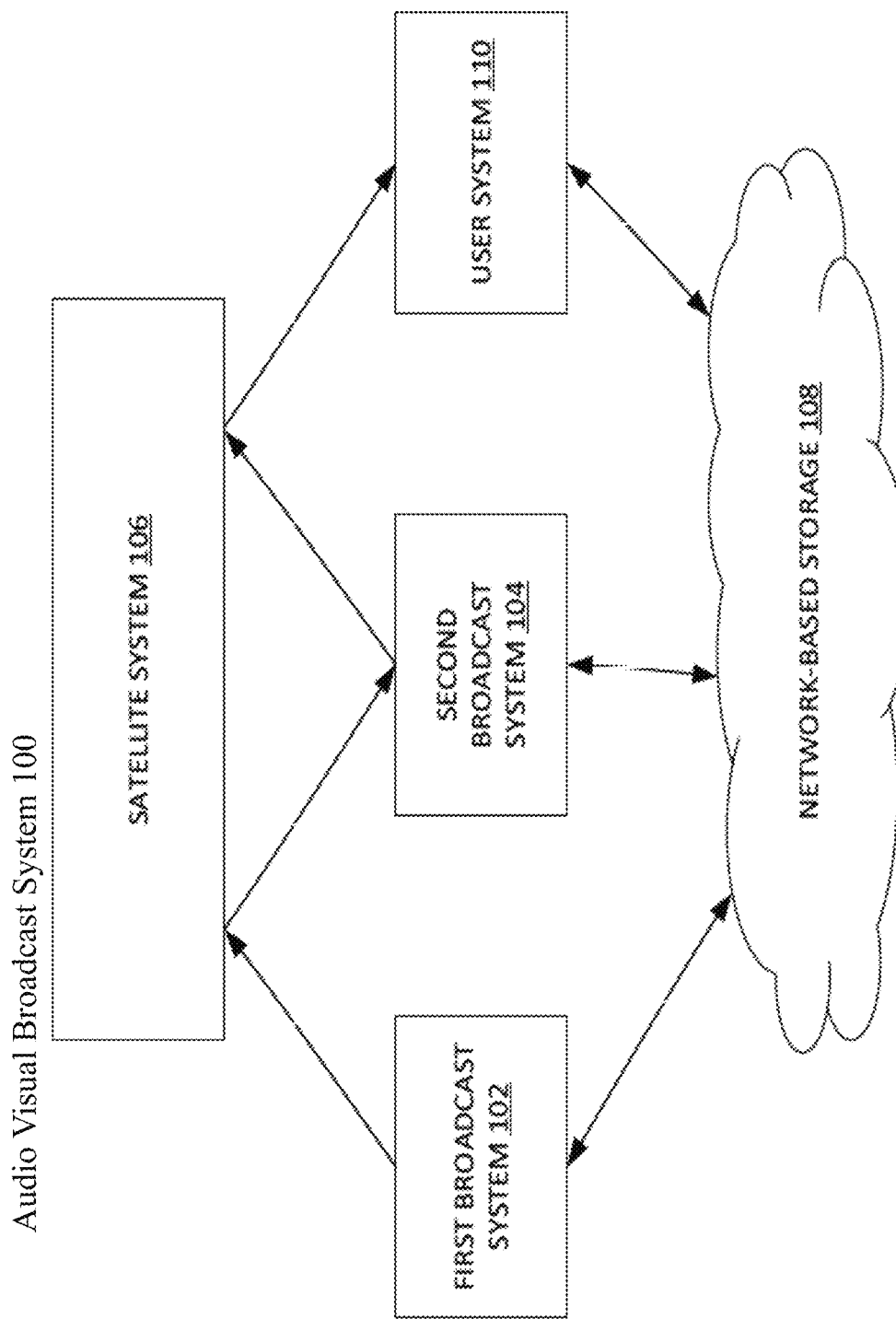
FIG. 1 depicts a block diagram of an example audiovisual broadcast system capable of providing synchronizing of audio and/or video stream as well as metadata using outband signaling according to some embodiments.

Some embodiments described herein provide for re-synchronizing metadata at any point downstream of an original transmission. There are many other benefits including but not limited to: lip-sync error correction (where the audio and video are out of sync), application of custom graphic overlays at any point prior to presentation, continuous measurement of transmission delay, synchronization of the audiovisual content to a stream of data sent via another path (e.g., the internet), auditing delivery of the audiovisual content to a particular point, synchronization of a disaster recovery broadcast origination with the main broadcast origination, application of synchronized timecode at multiple independent receive locations, and/or custom formatting of metadata to suit the needs of a distributor or viewer or other entity processing or viewing the content.

Embodiments of systems and methods are described for synchronizing metadata with audio and/or visual content at any number of points in a content delivery path. Temporal fingerprints may be generated at certain points of the audio and video, such as when an abrupt transition (or when a full cut) between successive frames of video takes place. The temporal fingerprints may be identified and sent out of band (e.g., via the internet), and/or may be stored in a network-based storage, such as the cloud. Temporal fingerprints may refer to temporal video fingerprints, temporal audio fingerprints, or temporal multimedia fingerprints. As discussed herein, temporal video fingerprints include timestamps associated with transitions or changes of content within video data. Video data may include video content. Video data may optionally include audio content (e.g., a YouTube video may be video data). Temporal audio fingerprints include timestamps associated with transitions or change of content within audio data (e.g., an audio file).

The temporal fingerprints may be utilized to signal positions within audio and/or video for insertion of metadata. In some embodiments, metadata may be used to signal precise times of events within the audiovisual content, for example, the start of an advertisement or a program. Metadata may also be used to signal the type of content (e.g. an advertisement, a chapter or an advertising break) as well as more specific information such as an event ID or characteristics of a particular scene.

In some embodiments, the temporal fingerprints may be generated by a first broadcast server and then sent from the first broadcast server to a second broadcast server, independent of the audio and/or video data itself (e.g., independent of the audio and/or video file). The audio and/or video data may be sent from the first broadcast server to the second broadcast server via a satellite, antenna, or any other means. The second broadcast server may receive the audio and/or video data and generate its own temporal fingerprints from the audio and/or video data. It will be appreciated that the temporal fingerprints may be generated by both the first and second broadcast servers, independently.

Although the timestamps for the temporal fingerprints generated by the first and second broadcast servers may be different, the positions of the temporal fingerprints relative to the audio and/or video data may be the same (or substantially the same). For example, if the first broadcast server generated timestamps associated with transitions of a video using a GPS system and a second broadcast server generated its own timestamps associated with the same transitions within the same video received from the first broadcast server eight hours later, then the timestamps of the second broadcast server will be eight hours after the timestamps of the first broadcast server. As such, time between timestamps of the two sets of temporal fingerprints may be consistent.

By matching the temporal fingerprints generated by the different broadcast servers and determining time differences between the temporal fingerprints, elapsed time can be determined. The elapsed time may represent time for transmission and processing of the audio and/or video signal by different recipients. The elapsed time may be utilized, in conjunction with the temporal fingerprints, to synchronize audio and/or video data (e.g., for consistent and precise insertion of metadata).

In addition to the ability to synchronize metadata, temporal fingerprints may be used to synchronize a broadcast with different end user devices. For example, a user may bring a smart phone displaying a particular football game, within listening range of a television broadcasting the same football game. In this example, the smart phone may generate audio temporal fingerprints from the sound of the television broadcast, and determine the elapsed time (e.g., delay) between the broadcast of the audio on the television to the receipt and processing by the smart phone. Using this information, the smart phone may be able to successfully synchronize the broadcast of the football game to the smart phone.

Some embodiments may also be used to synchronize two (or more) independent broadcast feeds, which may be useful for disaster recovery or purposes of redundancy. In case of natural disaster, for example, it may be necessary to have two independent broadcast feeds become synchronized if one fails to broadcast. To avoid interruption to the broadcast feed, it may be necessary to switch from one broadcast feed to another. By having each of the independent broadcast servers generate temporal fingerprints, the delay between the two broadcast feeds can be determined and the broadcasts can be locked together.

FIG. 1 depicts a block diagram of an example audiovisual broadcast system capable of providing synchronization of audio and/or video data as well as metadata using out-band signaling according to some embodiments. The audiovisual broadcast system 100 includes a first broadcast system 102, a second broadcast system 104, a satellite system 106, a network-based storage 108, and a user system 110.

A broadcast system includes any number of digital devices that broadcast (e.g., transmit) audio and/or video to any number of receivers (e.g., any number of user devices 110 and/or any number of other broadcast systems). In some embodiments, a broadcast system may transmit audio and/or video data to other broadcaster systems that may, subsequently, further broadcast the audio and/or video data.

A broadcast system may, in some embodiments, receive and capture audio and/or video content for transmission. For example, a broadcast system may record a football game or other live event for broadcasting. The broadcast system may transmit the programming or any other audio and/or video data to others. Although broadcast systems are depicted in FIG. 1, there may be multicast systems, narrowcast systems, and/or any other digital devices that transmit audio and/or video data that are in addition to or in place of one or more broadcast systems.

In some embodiments, first broadcast system 102 may capture audio and/or video data for viewing by the users on user system 110. Subsequent to the capture of the audio and/or video content (e.g., to generate audio and/or video data based on the content), the first broadcast system 102 may determine video transitions from the video component of the audiovisual broadcast and generate temporal video fingerprints by time stamping each video transition. Video transition indicates changes in the video (e.g., including color changes, movement, and/or the like in the video content).

The first broadcast system may generate timestamps using any clock (e.g., a GPS system). In some embodiments, the first broadcast system may utilize a clock that is available to one or more other digital devices (e.g., the second broadcast system 104 and/or the user device(s) 110).

The first broadcast system 102 may determine metadata to be inserted into the video content and generate a metadata index identifying metadata and a position for the metadata within the video content of the video data. For example, the first broadcast system 102 may determine that a particular advertisement should be inserted fifteen frames after a particular temporal fingerprint (e.g., after a particular timestamp) or should be inserted half a second after the particular temporal fingerprint. The first broadcast system 102 may include a metadata identifier identifying the particular advertisement and the insertion point in the temporal index.

The first broadcast system 102 may transmit the temporal video fingerprints, metadata, and/or metadata index to network-based storage 108 at any time (e.g., after the temporal video fingerprints are generated), any number of user devices 110, and/or any number of second broadcast systems 104. The audiovisual broadcast (e.g., the audio and/or video data) may be transmitted to second broadcast system 104 over a first network at any time (e.g., before or after first broadcast system 102 identifies audio and/or video transitions).

The first broadcast system 102 may determine video metadata timestamps relative to temporal video fingerprints. For example, the first broadcast system 102 may determine commercial insertion points in the video content relative to any number of temporal video fingerprints (e.g., relative to timestamps associated with video transitions in the content).

Packaged video metadata may be determined using the video metadata fingerprints. In some embodiments, first broadcast system 102 may transmit the packaged video metadata after the metadata is packaged. In some embodiments, first broadcast system 102 may generate a video metadata index using packaged video metadata.

The first broadcast system 102 may transmit the audio and/or video data to the second broadcast system 104 over a first network and/or any number of networks. In some embodiments, first broadcast system 102 may transmit the video metadata to second broadcast system 104 over a second network to network-based storage 108.

The second broadcast system 104 may receive the audio and/or video data to the second broadcast system 104. The second broadcast system 104 may receive the metadata index, temporal fingerprints generated by the first broadcast system 102, and metadata from the first broadcast system 104. It will be appreciated that the second broadcast system 104 may receive the audio and/or video data over a first network and may receive the metadata index, temporal fingerprints, and metadata over a different network (or any number of networks). As such, the second broadcast system 104 may receive the metadata index, temporal fingerprints, and metadata over a different network or connection.

The second broadcast system may determine temporal fingerprints of the video content of the audio and/or video data using methods similar to first broadcast system 102. For example, the second broadcast system may determine video transitions from the video component of the audiovisual broadcast and generate temporal video fingerprints by time stamping each video transition. Video transition indicates changes in the video (e.g., including color changes, movement, and/or the like in the video content).

The second broadcast system 104 may generate timestamps using any clock (e.g., a GPS system). In some embodiments, the second broadcast system 104 may utilize a clock that is available to one or more other digital devices (e.g., the first broadcast system 102 and/or the user device(s) 110).

It will be appreciated that video content may not change or may not significantly change regardless of formatting, compression, conversion, and/or any other transmission process. In order for viewers to enjoy the same programming, the video content of the program is the same (or substantially the same) regardless of medium, device, or channel. For example, size, speed, or enhancements to a presentation of a program may change, but the video content itself may not change unless it is a different program (otherwise the viewer is no longer watching the same program). As such, video transitions within the video content are consistent through the broadcast system regardless of which viewer is watching the video.

The second broadcast system 104 may match temporal fingerprints generated by the second broadcast system 104 with the temporal fingerprints generated by the first broadcast system 102 to synchronize the audio and/or video data. By matching the temporal fingerprints generated by first broadcast system 102 and second broadcast system 104, an elapsed time can be determined using the timestamps of the two sets of temporal fingerprints.

The second broadcast system 104 may use timing of the timestamps to determine the correct location within the audio and/or video data for metadata (e.g., based on the metadata index). The second broadcast system 104 may insert video associated with the video metadata into the location of the audio and/or video data and display and/or transmit the modified audio and/or video data to the user system(s) 110 and/or other broadcast systems over any number of networks.

First broadcast system 102 may transmit the video content, along with the metadata over the first network. The first broadcast system 102 may, in some embodiments, provide the temporal fingerprints generated by the first broadcast system 102 to the second broadcast system 104 in any number of ways (e.g., via the first network, a different network, or a different path on the same network). In various embodiments, the first network may include satellite communications provided by the satellite system 106. The satellite system may include any number of satellites configured to receive and transmit data (e.g., audio and/or video data, metadata, temporal fingerprints, and/or the like) from a broadcast system to any number of digital devices or systems (e.g., to a second broadcast system 104). Second broadcast system 104 may transmit the video content to user system 110 over a network (e.g., internet, satellite system 106, and/or any other networks).

The satellite system 106 includes one or more satellites. In some embodiments, the satellite system 106 may include other forms of electronic communication including wired or wireless network. It will be appreciated that the satellite system 106 may be any medium that can convey video and audio data using electromagnetic waves, whether guided (using wires) or unguided (without wires) or any storage medium whether magnetic, optical or in silicon.

The optional network-based storage 108 may store metadata (e.g., advertisements, graphics, video, audio, and/or the like) from first broadcast 102 and/or from any other digital devices. In some embodiments, network-based storage 108 may store temporal video fingerprints from the first broadcast system 102. In some embodiments, network-based storage 108 may store audio metadata and/or temporal audio fingerprints from first broadcast system 102. The network-based storage 108 may include any number of logical and/or hardware storage devices. Although only a single network-based storage 108 is depicted in FIG. 1, it will be appreciated that there may be any number of network-based storage 108.

In various embodiments, the network-based storage 108 may generate a first video fingerprint index from video fingerprints from first broadcast system 102 and store the first video fingerprint index in network-based storage 108. In some embodiments, network-based storage 108 may be omitted, and first video fingerprint index may be stored in the first broadcast system 102.

In some embodiments, the user system 110 may be or include one or more mobile devices (e.g., smartphones, cell phones, smartwatches, tablet computers, or the like), desktop computers, laptop computers, televisions and/or the like. In the illustrated embodiment, second broadcast system 104 provides the modified audio and/or video content (e.g., including metadata inserted by the second broadcast system 104) to user system 110. In various embodiments, the user system 110 may receive the audio and/or video content for display to a user.

In various embodiments, the user system 110 may determine its own temporal fingerprints using methods similar to the first broadcast system 102 and the second broadcast system 104. The user system 110 may receive previously generated temporal fingerprints from the first and/or second broadcast systems in any number of ways (e.g., over a network or a network communication path that is different than a network or a network communication path that was utilized to provide the audio and/or video content to the user system 110).

By matching the temporal fingerprints generated by second broadcast system 104 and/or user system 110 with temporal fingerprints generated by the user system 110, the user system may synchronize the modified audio and/or video data for further precision with metadata (e.g., for lip synchronization, audio synchronization, metadata synchronization, and/or the like). In various embodiments, the user system 110 may receive all or some of the metadata identified by the first broadcast system 102 and/or all or some of the metadata index. The user system 110 may synchronize or reposition metadata (e.g., audio, advertisements, and/or the like) using the identified metadata and/or the metadata index.

In the illustrated embodiment, two broadcast systems are shown, in other embodiments, audiovisual broadcast system 100 may comprise three or more broadcast system which may function similarly to first broadcast system 102 or second broadcast system 104.

Although some embodiments described herein utilize the temporal fingerprints to assist in determining or identifying locations for metadata, it will be appreciated that synchronization of video based on video content has a myriad of uses.

Figure 2:
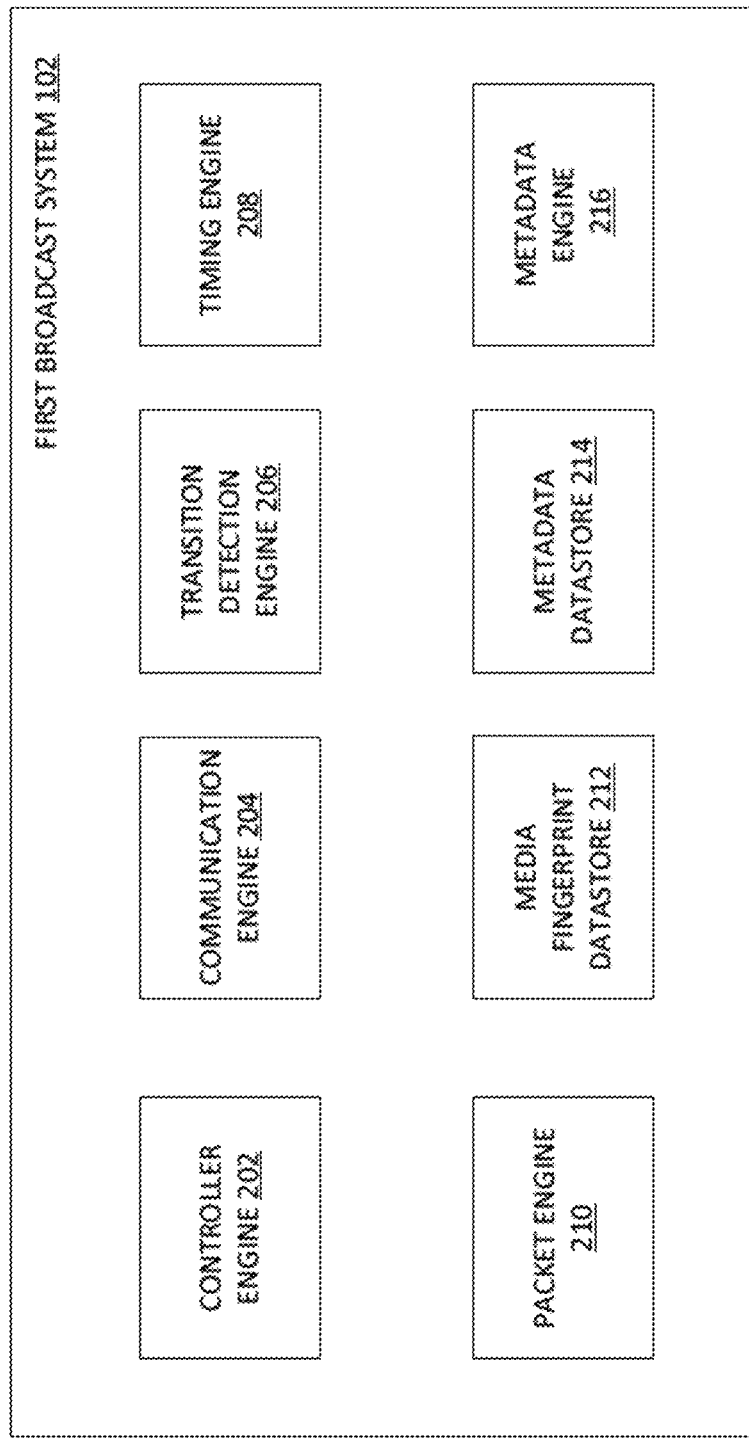
FIG. 2 depicts a block diagram of an example first broadcast system according to some embodiments.

FIG. 2 depicts a block diagram of the first broadcast system 102 according to some embodiments. The first broadcast system 102 includes a controller engine 202, a communication engine 204, a transition detection engine 206, a timing engine 208, a packet engine 210, a media fingerprint datastore 212, a metadata store 214 and a metadata engine 216. An engine may be hardware (e.g., an ASIC), software (e.g., including instructions executable by a processor), or a combination of both.

The controller engine 202 may manage one or more of the various engines shown in FIG. 2. For example, the controller engine 202 may direct the transition detection engine 206 to detect abrupt transitions between successive frames of video or abrupt transitions in the audio between successive moments in time. The controller engine 202 may direct the timing engine 208 to timestamp video transitions to generate temporal video fingerprints utilizing a Global Positioning System (GPS) clock to timestamp the audio and/or video transitions detected by transition detection engine 206. In another example, the controller engine 202 may direct the packet engine 210 to package temporal fingerprints with a network identifier. A network identifier may identify the broadcast network associated with the audio and/or video content. The controller engine 202 may be configured to facilitate communication engine 204 to transmit the video fingerprint or video metadata to network-based storage 108.

The communication engine 204 may transmit and/or receive data. For example, the communication engine 204 may transmit data between first broadcast system 102 and satellite system 106, and between first broadcast system 102 and network-based storage 108.

The transition detection engine 206 may scan audio and/or video data to detect transitions between successive frames of video or transitions in the audio between successive moments in time. In various embodiments, the transition detection engine 206 may scan through a video or audio component to identify video or audio transitions. In one example, the transition detection engine 206 detects one or more transitions within video content (e.g., abrupt changes in color, brightness, and/or the like). In some embodiments, the transition detection engine 206 may detect one or more transitions within audio content (e.g., abrupt changes in volume or sound(s) after a period of silence). A video or audio component of the audiovisual broadcast may be transmitted to second broadcast system 104 over the first network at any time before or after transition detection engine 206 identifies video or audio transitions.

Once any number of audio or video transitions have been detected, the transition detection engine 206 may send a request to the timing engine 208 for clock values (e.g., based on a GPS clock) to timestamp the audio or video transition. Timing engine 208 may receive the request from the transition detection engine 206 to create one or more temporal audio fingerprints or one or more temporal video fingerprints.

Video transitions may be detected and/or determined in any number of ways. In one example, the transition detection engine 206 may determine video transitions between successive frames of video with the following steps: 1) for each frame of video, the transition detection engine 206 may calculate histograms STREAM=($h_0$, $h_1$ ... $h_n$) for every chroma/luma/color channel where n is the number of possible pixel brightness levels for the particular channel and $h_i$ is the count of pixels with value i in each frame of video. For example, if YUV color space is used with 8 bits of depth there would be three histograms created for each video frame:

$$STREAM=STREAM(h_0,h_1, \ldots h_{25})$$

$$H_U=H_U(h_0,h_1, \ldots h_{25})$$

$$H_V=H_V(h_0,h_1, \ldots h_{25})$$

2) the transition detection engine 206 may calculate a sum of absolute differences (SAD) is calculated between the histogram vectors of every pair of adjacent frames. For two histogram vectors A=($a_0$, $a_1$ ... $a_n$) and B=($b_0$, $b_1$ ... $b_n$) the sum of absolute differences is:

$$SAD(A, B) = \sum_{i=0}^{n} |a_i - b_i|$$

The resulting value quantifies a similarity of two adjacent frames; the more similar the frames are, the closer the value is to zero. The transition detection engine 206 may compare this value to a threshold or moving average of the SAD of histograms from previous frames with a sample window of double the video framerate. In one example, when the value is 20-30 times higher than the moving average, a suitable pair of frames may be found. It will be appreciated that transitions may be determined based on any comparison of the value with a reference (e.g., moving average). For example, if the value is significantly higher (e.g., two more times higher) than the value, a transition may be determined.

3) "Abrupt transitions" between frames A and B may be the basis for temporal fingerprints, calculated in this example by the transition detection engine 206 as follows: a) the histogram vectors STREAM(A) and STREAM(B) may be decimated to the size of 16(H'(A)&H'(B)) as follows: where STREAM(A)=($a_0$, $a_1$ ... $a_n$); H'(A)=($h_0$, $h_1$ ... $h_{15}$)

$$h_i = \sum_{j=\frac{i(n+1)}{16}}^{\frac{(i+1)(n+1)}{16}-1} a_j$$

b) the resulting 16-dimensional vectors are subtracted as matrices, and the result of this subtraction is used as a temporal video fingerprint.

The timing engine 208 may be configured to generate a timestamp associated with an audio or video transition detected by the transition detection engine 206 to generate temporal fingerprint. When the timing engine 208 receives a request from the transition detection engine 206 for the current time, the timing engine 208 may retrieve a clock signal or time (e.g., according to the GPS clock) to timestamp the audio or video transition. In various embodiments, timing engine 208 may provide the current time according to a UNIX clock or any other clock. It will be appreciated that the timing engine 308 may provide the current time in any number of ways (e.g., according to Coordinated Universal Time (UTC)).

The packet engine 210 may package the timestamp and/or network identifier together. In various embodiments, the packet engine 210 may package an audio and/or video data identifier (i.e., an identifier that identifies audio data, video data, or the like). In some embodiments, the packet engine 210 may package metadata, timestamp, and/or network identifier together. The network identifier may identify the broadcast network associated with the audio and/or video data (e.g., the broadcast system or network associated with generating the audio and/or video data, generating the initial temporal fingerprints, and/or the like).

In some embodiments, the network identifier may be used to information used to identify the show, such as production code. Network identifiers may be used by the first broadcast system 102 and second broadcast system 104 during the comparison of temporal video fingerprints. For example, the network identifier received from first broadcast system 102 may match the network identifier generated by second broadcast system 104. Once a video temporal fingerprint has been packaged, it may be sent by the first network to network-based storage 108, the second broadcast system 104, and/or any number of user systems 110. In some embodiments, the packet engine 210 may package video transitions, audio transitions, timestamps, and/or the network identifier.

The media fingerprint datastore 212 may be or may include any structure and/or structures suitable for storing data entries or records (e.g., an active database, a relational database, a self-referential database, a table, a matrix, an array, a flat file, a documented-orientated storage system, a non-relational No-SQL system, an FTS-management system such as Lucene/Solar, and the like). Media fingerprints may store packaged audio and/or video fingerprints. In some embodiments, media fingerprint datastore 212 may store audio fingerprint index and/or video fingerprint index.

The metadata engine 216 may be configured to determine locations within the audio and/or video data associated or for metadata. In one example, the metadata engine 216 may utilize a video metadata timestamp relative to a temporal video fingerprint. For example, metadata engine 216 may determine that video metadata (e.g., a title, length, start time, and/or the like of a car commercial) may be inserted at, for example, 1 frame or at specific times (e.g., $\frac{1}{30}^{th}$ of a second), after a particular temporal video fingerprint. The metadata engine 216 may associated the video metadata with a video file of the car commercial. The video file of the car commercial in this example may be stored in metadata datastore 214 and/or another digital device. In other embodiments, the video metadata may be stored in network-based storage 108. Similarly, metadata engine 216 may be configured to determine an audio metadata timestamp relative to a temporal audio fingerprint.

The metadata engine 216 may generate an audio or video metadata index using the audio or video metadata respectively. The metadata index may include metadata identifiers associated with temporal fingerprints (e.g., timestamps) of audio and/or video data (e.g., of a particular audio and/or video file). In some embodiments, the metadata index may include an audio and/or video data identifier that identifiers the audio and/or video data. The metadata index may include metadata identifiers and temporal fingerprints associated with any number of different audio and/or video files. Although the metadata index is identified as an index, it will be appreciated that any data structure (e.g., a table) may be utilized to store the information.

The metadata datastore 214 may be or may include any structure and/or structures suitable for storing data entries or records (e.g., an active database, a relational database, a self-referential database, a table, a matrix, an array, a flat file, a documented-orientated storage system, a non-relational No-SQL system, an FTS-management system such as Lucene/Solar, and the like). The metadata datastore 214 may store audio and/or video metadata associated with respective temporal audio and/or video temporal fingerprint. In some embodiments, metadata datastore 214 may store a hyperlink to a video and/or audio file stored in another location, or on the world wide web.

Figure 3:
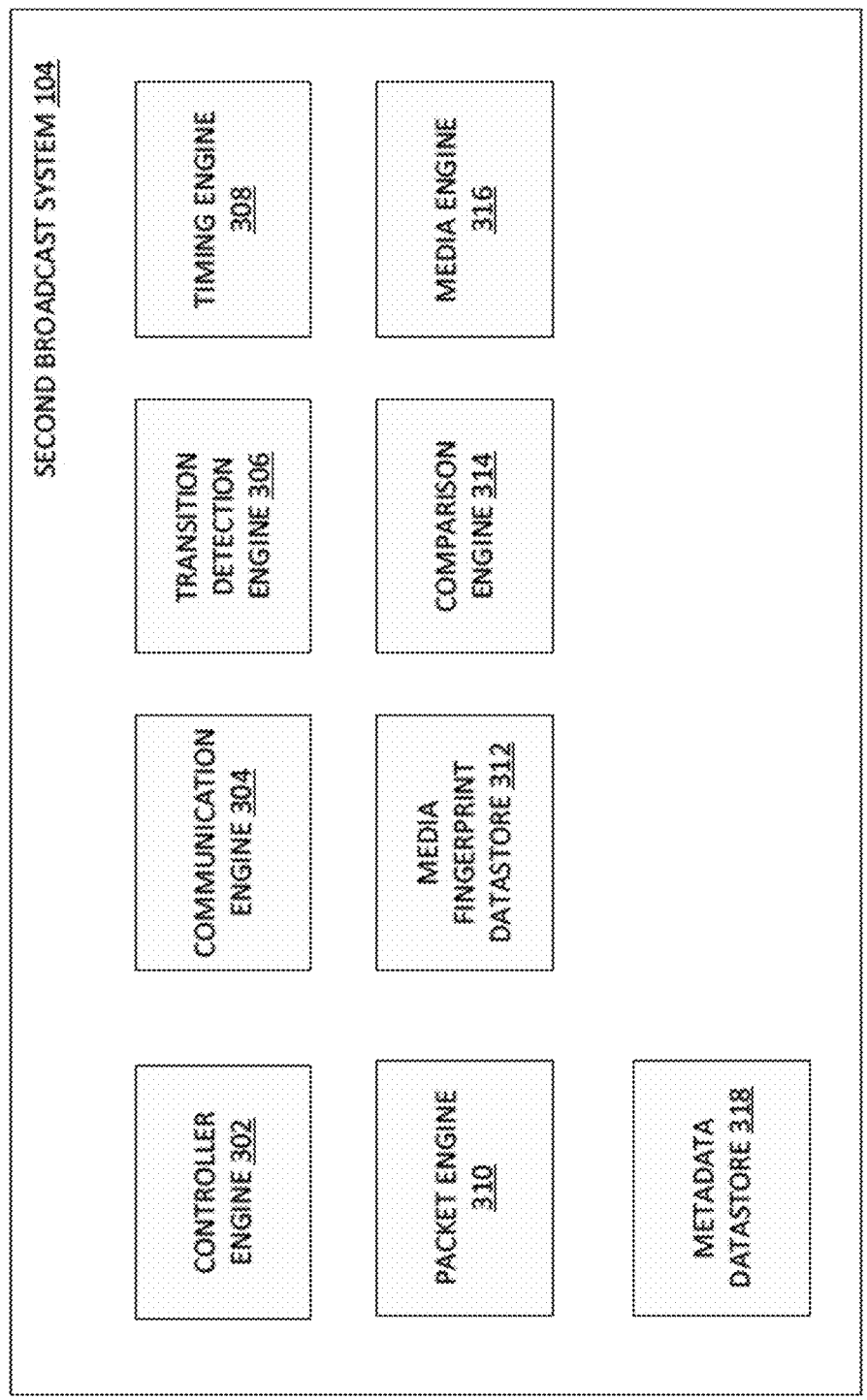
FIG. 3 depicts a block diagram of an example second broadcast system according to some embodiments.

FIG. 3 depicts a block diagram of second broadcast system 104 according to some embodiments. The second broadcast system 104 may receive audio and/or video data from the first broadcast system 102 and generate temporal fingerprints in a manner similar to that of the first broadcast system 102. The second broadcast system 104 may also receive the temporal fingerprints from the first broadcast system, compare the two sets of temporal fingerprints to synchronize the audio and/or video data and determine locations associated with or to insert metadata. The second broadcast system 104 may retrieve the metadata from any number of storage devices or receive the metadata (e.g., from the first broadcast system 102 or network-based storage 108). The second broadcast system 104 may subsequently broadcast the modified audio and/or video data (e.g., the audio and/or video data with the inserted metadata) to other broadcast systems and/or digital devices (e.g., user devices 110).

The second broadcast system 104 may include a controller engine 302, a communication engine 304, a transition detection engine 305, a timing engine 308, a packet engine 310, a media fingerprint datastore 312, a comparison engine 314, a media engine 316, and a metadata datastore 316. Although FIG. 3 depicts the second broadcast system 104, any number of the engines and/or datastores, as well as their functions, may be performed by a user device 110 (e.g., for synchronization of audio and/or video data, insertion of metadata, correcting locations of metadata, lip synchronization, audio synchronization, metadata synchronization, and/or the like).

The controller engine 302 may manage one or more of the various engines shown in FIG. 3. For example, the controller engine 302 may direct the transition detection engine 306 to detect abrupt transitions between successive frames of video or abrupt transitions in the audio between successive moments in time. The controller engine 302 may direct the timing engine 308 to timestamp video transitions to generate temporal video fingerprints utilizing a Global Positioning System (GPS) clock to timestamp the audio and/or video transitions detected by transition detection engine 306. In another example, the controller engine 202 may direct the comparison engine 314 to compare temporal fingerprints received from first broadcast system 102 with temporal fingerprints detected by transition detection engine 306.

The communication engine 304 may transmit data between second broadcast system 104 and network-based storage 108 and/or between second broadcast system 104 and user systems 110.

The transition detection engine 306 of the second broadcast system 104 may be similar to the transition detection engine 206 of the first broadcast system 102. The transition detection engine 306 may scan audio and/or video data to detect transitions between successive frames of video or transitions in the audio between successive moments in time. In various embodiments, the transition detection engine 306 may scan through a video or audio component to identify video or audio transitions. In one example, the transition detection engine 306 detects one or more transitions within video content (e.g., abrupt changes in color, brightness, and/or the like). In some embodiments, the transition detection engine 306 may detect one or more transitions within audio content (e.g., abrupt changes in volume or sound(s) after a period of silence).

Once any number of audio or video transitions have been detected, the transition detection engine 306 may send a request to the timing engine 308 for clock values (e.g., based on a GPS clock) to timestamp the audio or video transition. The timing engine 308 may receive the request from transition detection engine 306 to create one or more temporal audio fingerprints or one or more temporal video fingerprints.

Video transitions may be detected and/or determined in any number of ways. in some embodiments, the transition detection engine 306 detects and/or determines video transitions within video data using the method described regarding the transition detection engine 206 discussed herein.

The timing engine 308 may be configured to generate a timestamp associated with an audio or video transition detected by the transition detection engine 306 to generate temporal fingerprint. When the timing engine 308 receives a request from the transition detection engine 306 for the current time, the timing engine 308 may retrieve a clock signal or time (e.g., according to the GPS clock) to timestamp the audio or video transition. In various embodiments, timing engine 308 may provide the current time according to a UNIX clock or any other clock. It will be appreciated that the timing engine 308 may provide the current time in any number of ways (e.g., according to Coordinated Universal Time (UTC)).

The packet engine 310 may package the timestamp and/or network identifier together. In various embodiments, the packet engine 310 may package an audio and/or video data identifier (i.e., an identifier that identifies audio data, video data, or the like). In some embodiments, the packet engine 310 may package metadata, timestamp, and/or network identifier together. The network identifier may identify the broadcast network associated with the audio and/or video data (e.g., the broadcast system or network associated with generating the audio and/or video data, generating the initial temporal fingerprints, and/or the like).

Once a video temporal fingerprint has been packaged, it may be sent to any number of digital devices (e.g., other broadcast systems and/or other user systems 110). In some embodiments, the packet engine 310 may package video transitions, audio transitions, timestamps, and/or the network identifier.

The media fingerprint datastore 312 may be or include any structure and/or structures suitable for storing data entries or records (e.g., an active database, a relational database, a self-referential database, a table, a matrix, an array, a flat file, a documented-orientated storage system, a non-relational No-SQL system, an FTS-management system such as Lucene/Solar, and the like). The media fingerprint datastore 312 may store temporal fingerprints (e.g., audio fingerprints, video fingerprints, and/or multimedia fingerprints.

The comparison engine 314 may be configured to compare the temporal fingerprints received from first broadcast system 102 with the temporal fingerprints generated by the transition detection engine 306. When the same transitions are detected by transition detection engine 306, the difference between the timestamp of the two temporal fingerprints may be determined. This difference, also referred to as the time offset, may be used to synchronize audio and/or video for consistent and precise insertion of metadata, correct lip sync issues and two independent broadcast feeds which may be useful for disaster recovery.

In other embodiments, comparison engine 314 may be configured to detect audio transitions received from first broadcast system 102 with audio transitions detected by transition detection 306.

The metadata engine 316 may be configured to identify metadata using the metadata index (e.g., received from the first broadcast system 102) as well as identify one or more locations within the audio and/or video data for the identified metadata (e.g., to insert or adjust the identified metadata relative to the audio and/or video data). For example, the metadata engine 316 may identify one or more locations within the audio and/or video data based on the temporal fingerprints generated by the second broadcast system 104, the comparison of the temporal fingerprints (e.g., based on the time offset), and/or number of frames before or after any number of abrupt transitions within the video content of the audio and/or video data.

In various embodiments, the first broadcast system 102 may be configured to inform the metadata engine 316 of the video to associate with a particular video metadata timestamp. The second broadcast system 104 may replace video (e.g., a commercial) associated with the particular video metadata timestamp with a different video (e.g., a different commercial). In some embodiments, the metadata engine 316 may generate an audio or video metadata index using the audio or video metadata fingerprints respectively. Similarly, the metadata engine 316 may be configured to determine an audio metadata timestamp relative to a temporal audio fingerprint, and associate an audio file with the audio metadata timestamp.

The metadata datastore 318 may be or include any structure and/or structures suitable for storing data entries or records (e.g., an active database, a relational database, a self-referential database, a table, a matrix, an array, a flat file, a documented-orientated storage system, a non-relational No-SQL system, an FTS-management system such as Lucene/Solar, and the like). The metadata datastore 316 may store audio and/or video data associated with their respective temporal audio and/or video metadata fingerprint. In some embodiments, metadata datastore 318 may store a hyperlink to a video and/or audio file stored in another location, or on the world wide web.

Figure 4:
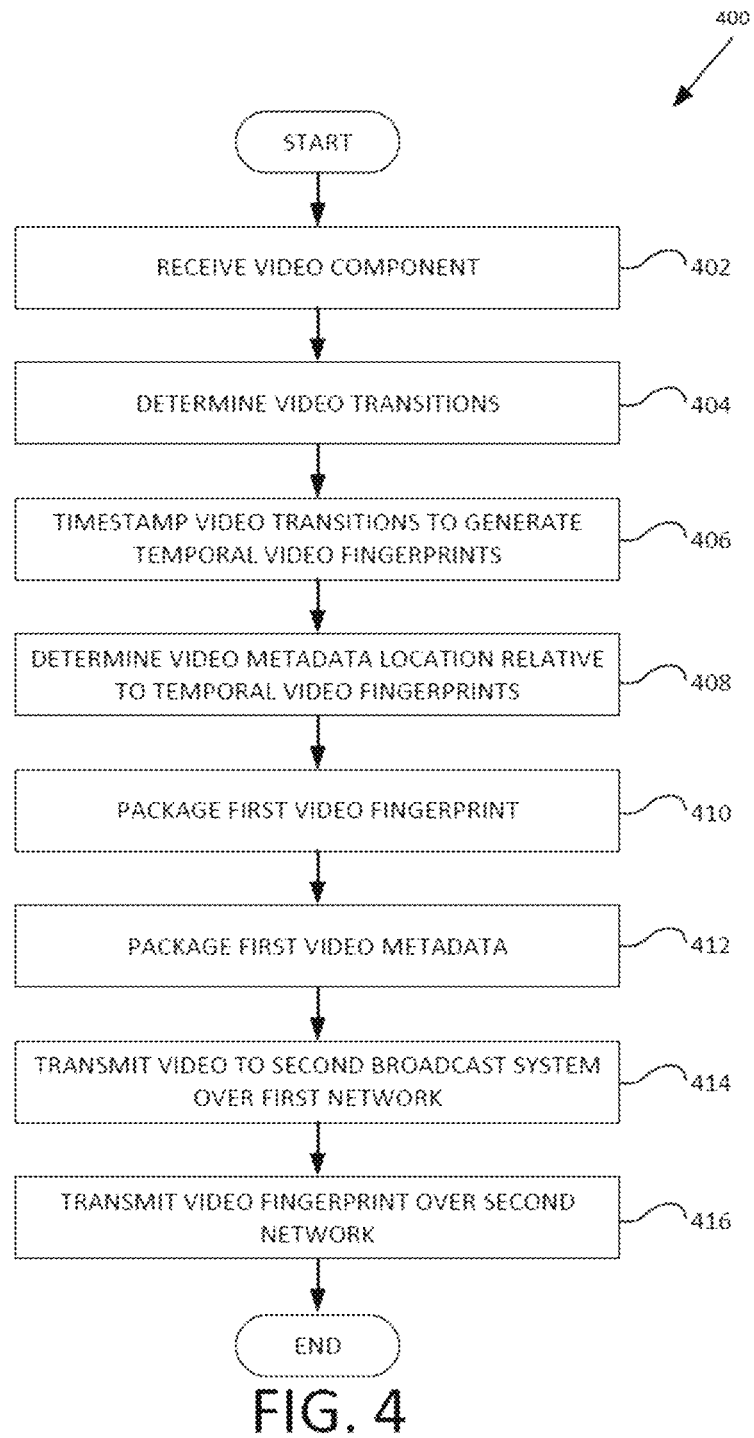
FIG. 4 depicts a flowchart of a video broadcasting method of a first broadcast server according to some embodiments.

FIG. 4 depicts a flowchart of a first video broadcasting method 400 utilizing the first broadcast system 102 according to some embodiments. In step 402, the first broadcast system 102 may receive the video component of the audiovisual broadcast (e.g., video data that includes audio). The first broadcast system 102 may receive audio and/or video content as part of a live broadcast and/or generate audio and/or video data.

In step 404, the transition detection engine 206 may scan through the video component of the audiovisual broadcast to identify video transitions. The transition detection engine 206 may be configured to identify video transitions by scanning through the video component of the audiovisual broadcast until the end of the program or show or over any portion of the program or show.

It will be appreciated that the video component of the audiovisual broadcast may be transmitted to the second broadcast system 104 and/or user devices 110 over the first network via the satellite system 106 at any time before or after the transition detection engine 206 identifies video transitions. In one example, such as a live broadcast, the first broadcast system 102 may send the video component of the audiovisual broadcast before the transition detection engine 206 identifies video transitions. In another example, the first broadcast system 102 may send a segment of the video component of the audiovisual broadcast after it has been scanned by transition detection engine 206. The transition detection engine 206 may determine the video histogram for every chroma/luma/color channel and calculate a sum of absolute differences between the histogram vectors of every pair of adjacent frames. For example, the transition detection engine 206 may detect video transition 'A' at the beginning of frame 150, video transition 'B' at the beginning of frame 234 and video transition 'C' at the beginning of frame 357.

In step 406, for each detected video transition, the timing engine 208 may generate a timestamp based on the current time according to the GPS clock to timestamp the video transition. For example, the timing engine 208 may generate a timestamp of a current time X1 for video transition 'A.' In one example, the timing engine 208 may provide the current time according to an UNIX clock. It will be appreciated that the timing engine 208 may retrieve a time for the timestamp(s) from any source (e.g., according to Coordinated Universal Time (UTC)).

In step 408, the metadata engine 216 determines specific metadata such as a commercial or other metadata relative to a temporal video fingerprint. For example, the video metadata associated with, for example, a car commercial may be placed 100 frames after video transition 'A' or 16 frames after video transition 'B.' In another example, the video metadata may be placed 32 milliseconds after video transition 'A' or 28 milliseconds before video transition 'B.'

In some embodiments, upon determination of the relative frame position of the video metadata relative to one or more temporal video fingerprints, a video metadata timestamp may be determined. There may not be a video metadata timestamp associated with every temporal fingerprint, but each video metadata maybe associated with more than one temporal video fingerprints.

In various embodiments, the metadata engine 216 creates a metadata index identifying metadata and associating different identified metadata with positions in the audio and/or video data using the temporal timestamps.

In step 410, the packet engine 210 may package the temporal timestamps and network identifier together. The network identifier may be used by second broadcast system 104 during the comparison of temporal fingerprints (e.g., by the second broadcast system 104 and/or user device(s) 110). The network identifier of the temporal video fingerprint from the first broadcast 102 and the temporal video fingerprint from the second broadcast 104 may be compared to ensure that the temporal fingerprints are from the same audiovisual broadcast and for synchronization.

In step 412, the packet engine 210 may package metadata and the network identifier together. Similar to the network identifier associated with packaging temporal fingerprints, the network identifier may be used to ensure that the metadata is being inserted into the correct audiovisual broadcast. In various embodiments, packaging the metadata, temporal timestamps, metadata index, or the like is optional. It will be appreciated that the metadata, temporal timestamps, metadata index, or the like may be sent individually, together, or in any combination to another digital device.

In step 414, the communication engine 204 may transmit the audio and/or video data over the first network to the satellite system 106. In other embodiments, the communication engine 204 may transmit the audio and/or video data over the first network to user system 110 via satellite system 106. In various embodiments, the first network may include satellite communications provided by satellite system 106. In other embodiments, the first network may include wired or wireless computer network.

In step 416, the communication engine 204 may transmit the temporal fingerprints, metadata index, and/or metadata over the second network to network-based storage 108. In some embodiments, the communication engine 204 may be transmit the temporal fingerprints, metadata index, and/or metadata over the second network to user system 110 and/or the second broadcast system 104. The second network may represent a different band or connection to the receiving device(s).

It will be appreciated that the first broadcast system 102 may provide any portion of the audio and/or video data as well as portions temporal fingerprints, a portion of the metadata index, and/or any metadata at any time including during scanning and before the determination of all temporal fingerprints of the same audio and/or video file is complete. The first broadcast system 102 may complete scanning all or a portion of the video component of the audiovisual broadcast, identify additional video transitions, and package the additional temporal fingerprints and metadata.

Figure 5:
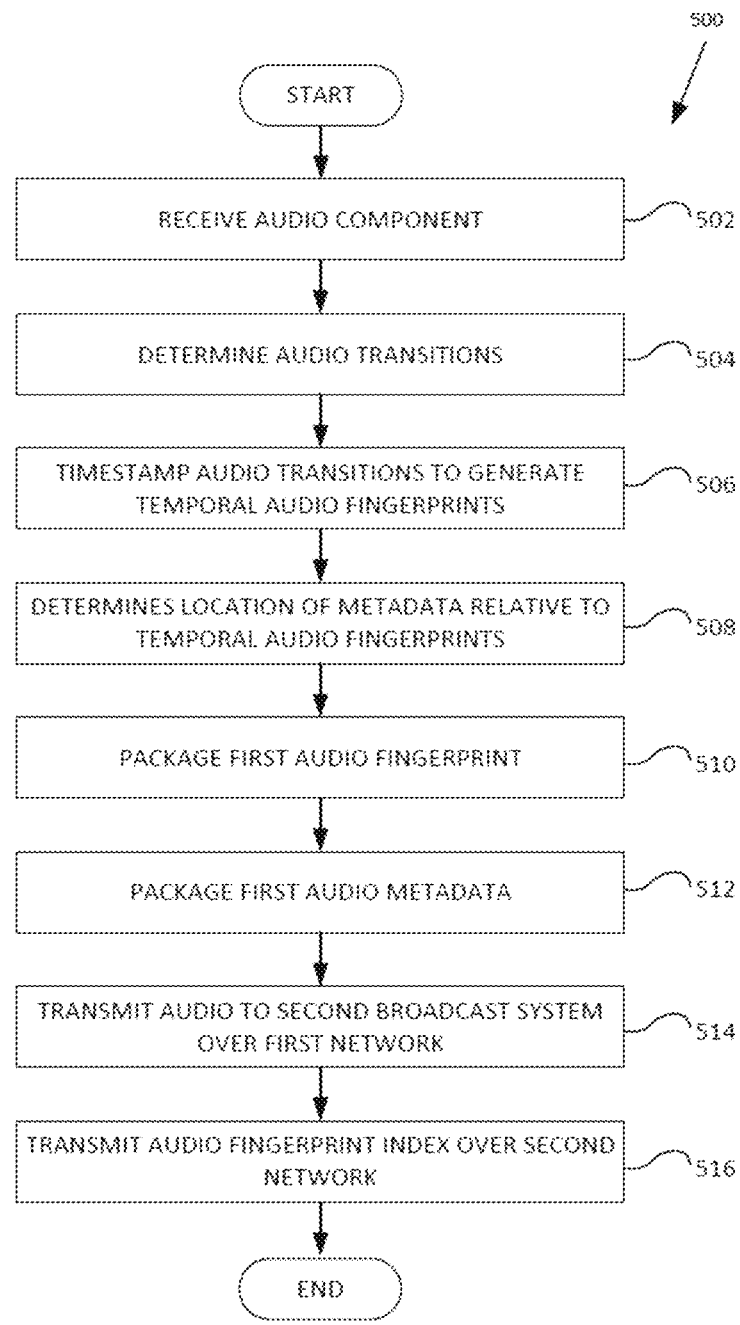
FIG. 5 depicts a flowchart of an audio broadcasting method of the first broadcast server according to some embodiments.

FIG. 5 depicts a flowchart of a first audio broadcasting method 500 of first broadcast system 102 according to some embodiments. In step 502, the first broadcast system 102 may receive audio data (e.g., an audio file).

In step 504, the transition detection engine 206 may scan through any portion of an audio component of the audio broadcast (or an audio/video broadcast) to identify audio transitions. For example, the transition detection engine 206 may detect audio transition 'A', audio transition 'B' and audio transition 'C'. In various embodiments, the audio component of the audiovisual broadcast may be transmitted to the second broadcast system 104 over the first network via satellite system 106 at any time before or after transition detection engine 206 identifies audio transitions.

The transition detection engine 206 may determine audio transitions between successive moments in time. In one example:

1) The transition detection engine 206 may downmix audio to a monaural signal by adding corresponding samples. In the downmix process, a common downmix formula may be applied where the center channel(s) may be taken at −3 dB, LS, RS at −6 dB, LFE channel discarded. The transition detection engine 206 may choose a time interval for binning in such manner as to: a) produce an integer number that is a multiple of 16 of digital audio signal samples for this interval given the original sampling rate of the signal; b) have the time interval that is several times lower than the duration of one video frame of the content. For example, in a scenario with 48 kHz sampled PCM audio with 30 frame per second video, the transition detection engine 206 may choose 10 ms, which may result in 480 samples per interval (16×30), and approximately 3 intervals per frame.

2) The transition detection engine 206 may split continuous digital audio amplitude samples into sections representing the selected time interval. Each section may be converted from time-domain to frequency domain using a Fast Fourier Transform algorithm, and the resulting vector may be decimated into 16 bins by summing adjacent results up. In the example with 480 sample segments, bin 0 may be sum of FFT result values 0 through 29, and so on.

3) The transition detection engine 206 may analyze a sequence of resulting 16-dimensional vectors, and abrupt audio transitions may be detected by evaluating the sum of absolute differences between the vectors calculated from adjacent intervals, in the same or similar manner as described in step 1b for video fingerprints.

4) Once the abrupt transitions are identified, they may become the basis for audio temporal fingerprints, that include both 16-dimensional vectors calculated based on adjacent time intervals.

The timing engine 208 may retrieve a clock signal (e.g., according to the GPS clock) to create a timestamp for each audio transition. In some embodiments, the transition detection engine 206 creates the timestamp using a clock signal from the timing engine 208 to generate a temporal audio fingerprint. For example, the timing engine 208 may receive the request from transition detection engine 206 of audio transition 'A' and send the current time of X4. In some embodiments, the timing engine 208 may provide the current time according to an UNIX clock. In other embodiments, timing engine 208 may provide the current time according to UTC.

In step 508, the metadata engine 216 determines location of metadata associated with a commercial or other metadata relative to one or more temporal audio fingerprints. For example, audio metadata associated with, for example, a sportscaster's commentary may be placed 2 seconds after audio transition 'A' or 16 frames after audio transition 'B.'

Upon determination of the relative position of the metadata relative to one or more temporal audio fingerprint, the audio metadata timestamp or an index identifier for the metadata can be determined. There may not be an audio metadata timestamp associated with every temporal fingerprint, but each audio metadata maybe associated with more than one temporal audio fingerprint.

In step 510, the packet engine 210 may be optionally configured to package the temporal audio fingerprints and network identifier together. The network identifier may be used by the second broadcast system 104 during the comparison of temporal audio fingerprints. The network identifier of the temporal audio fingerprint from the first broadcast 102 and the temporal video fingerprint from the second broadcast 104 may be compared to ensure that the temporal fingerprints are from the same audiovisual broadcast.

In step 512, the packet engine 210 may optionally be configured to package audio metadata, temporal fingerprints, and/or network identifier together. Similar to the network identifier associated with packaging temporal audio fingerprints, the network identifier may be used to ensure that the metadata is being inserted into the correct audiovisual broadcast.

In step 514, the audio data may be transmitted over the first network to the second broadcast system 104 via the satellite system 106. In other embodiments, the audio data may be transmitted over the first network to user system 110. In some embodiments, after transition detection engine 206 detects an audio transition, such as in step 504, the section of audio that has already been scanned may be transmitted.

In step 516, the temporal audio fingerprints may be transmitted over the second network to network-based storage 108. In other embodiments, the temporal audio fingerprints may be transmitted over the second network to the user system 110.

Figure 6:
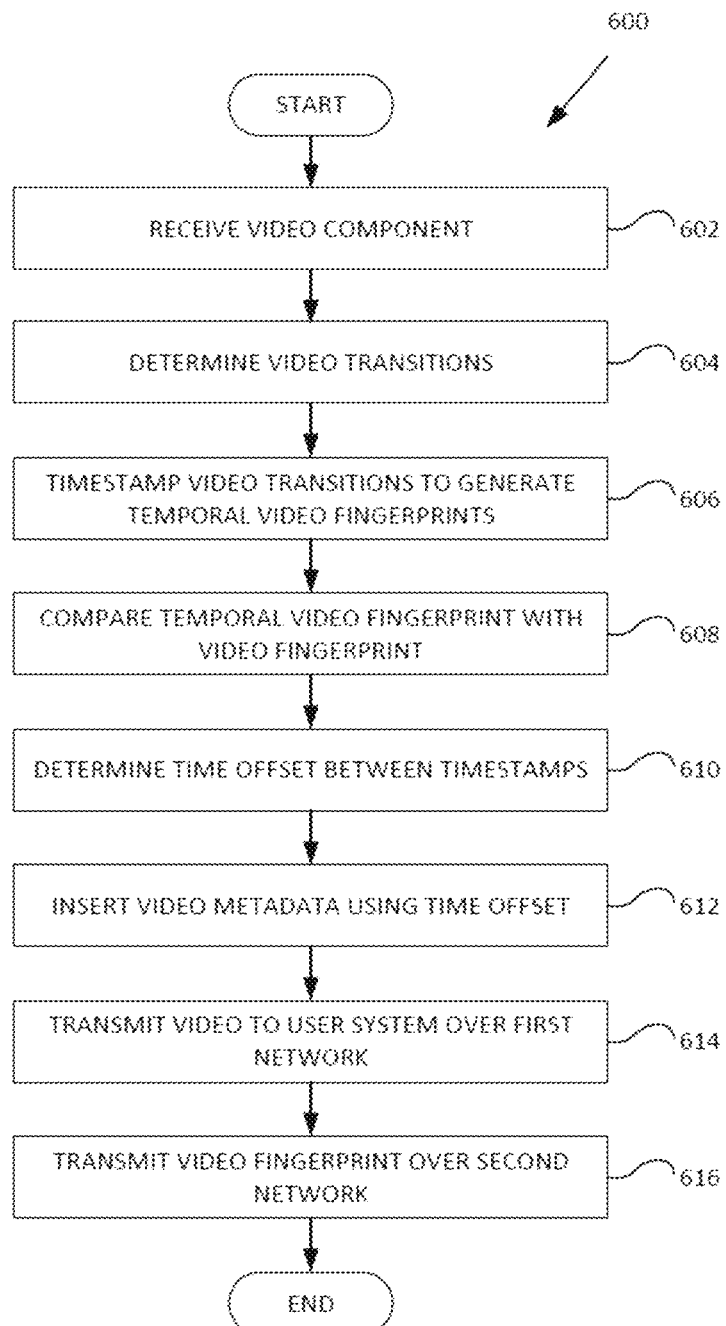
FIG. 6 depicts a flowchart of a video broadcasting method of a second broadcast server local stock image upload method according to some embodiments.

FIG. 6 depicts a flowchart of a second video broadcasting method 600 of second broadcast server 104 according to some embodiments. In step 602, the second broadcast system 104 may receive the audio and/or video data from the first broadcast system 102 (e.g., via the satellite system 106).

In step 604, the transition detection engine 306 may scan through any portion of the video component of the video and/or audio data to identify video transitions. In various embodiments, the video and/or audio data may be transmitted to the user system 110 over the first network via satellite system 106 at any time before or after transition detection engine 306 identifies video transitions. Similar to step 404 of first video broadcasting method 400, the transition detection engine 306 may detect the same video transitions in step 604. For example, the transition detection engine 306 may detect video transition 'A' at the beginning of frame 150, video transition 'B' at the beginning of frame 234 and video transition 'C' at the beginning of frame 357.

Once a video transition has been detected, the timing engine 308 may retrieve a current time according to the GPS clock to timestamp the video transition in step 606. The timing engine 308 may receive a request and transmit the current time to the transition detection engine 306. The transition detection engine 306 may receive the current time and associate the received time to generate a temporal video fingerprint. For example, the timing engine 308 may receive the request from the transition detection engine 306 of video transition 'A' and send the current time of X1+Y1. Where Y1 represents the time elapsed between the first broadcast system 102 detect the video transition, generate the temporal video fingerprint, package the temporal video fingerprint with the network identifier, transmit the package to second broadcast system 104, the second broadcast system 104 detect the video transition and generate the temporal video fingerprint.

For live audiovisual broadcast, the time elapsed may represent the transmission and processing time of the audio and/or video content. For on-demand broadcast, users of user system 110 may select audio and/or video content when they choose rather than at the specific broadcast time. Y1, in this case, may represent the time elapsed to process the audio and/or video content as well as the time between the original broadcast and when the user chooses to access the audio and/or video content.

In step 608, the comparison engine 314 may compare the temporal video fingerprint received from first broadcast system 102 with temporal video fingerprints generated from transition detection engine 306. It will be appreciated that the second broadcast system 104 may receive the temporal fingerprints generated by the first broadcast system 102 in any number of ways. In some embodiments, the comparison engine 314 may require some number of consecutive matches between temporal video fingerprints from first broadcast system 102 and second broadcast system 104 with matching timestamp deltas to determine the time offset of the video component of the audiovisual broadcast. A timestamp delta may be the time difference between consecutive temporal video fingerprints.

In step 610, the comparison engine 314 determines the time offset between the temporal video fingerprint(s) from first broadcast system 102 and the temporal video fingerprint(s) of the second broadcast system 104.

Once the time offset has been determined, metadata may be inserted into the video component of the video and/or audio data in step 612. The second broadcast system 104 may insert a video according to the metadata sent by first broadcast system 102 or retrievable from network storage. In some embodiments, second broadcast system 104 may replace previously existing metadata with other metadata chosen by the second broadcast system 104. In some embodiments, video metadata may point to a video file stored in network-based storage 108. In other embodiments, video metadata may include a hyperlink, a video graphic, a graphic interchange format (GIF), or the like. Once metadata is added to the video and/or audio data, the resulting combination may be referred to as modified video and/or audio data.

In step 614, the modified video and/or audio data may be transmitted over the first network to user system 110 (e.g., via satellite system 106). In some embodiments, after the transition detection engine 306 detects a video transition, such as in step 604, the section of video that has already been scanned may be transmitted over the first network. In various embodiments, the first network may include satellite communications provided by satellite system 106. In other embodiments, the first network may include wired or wireless computer network.

In step 616, the temporal video fingerprint and video metadata may be optionally transmitted over the second network to network-based storage 108.

The second broadcast system 104 may finish scanning the video component of the audiovisual broadcast and identify the video transitions and package the video fingerprints and video metadata.

Figure 7:
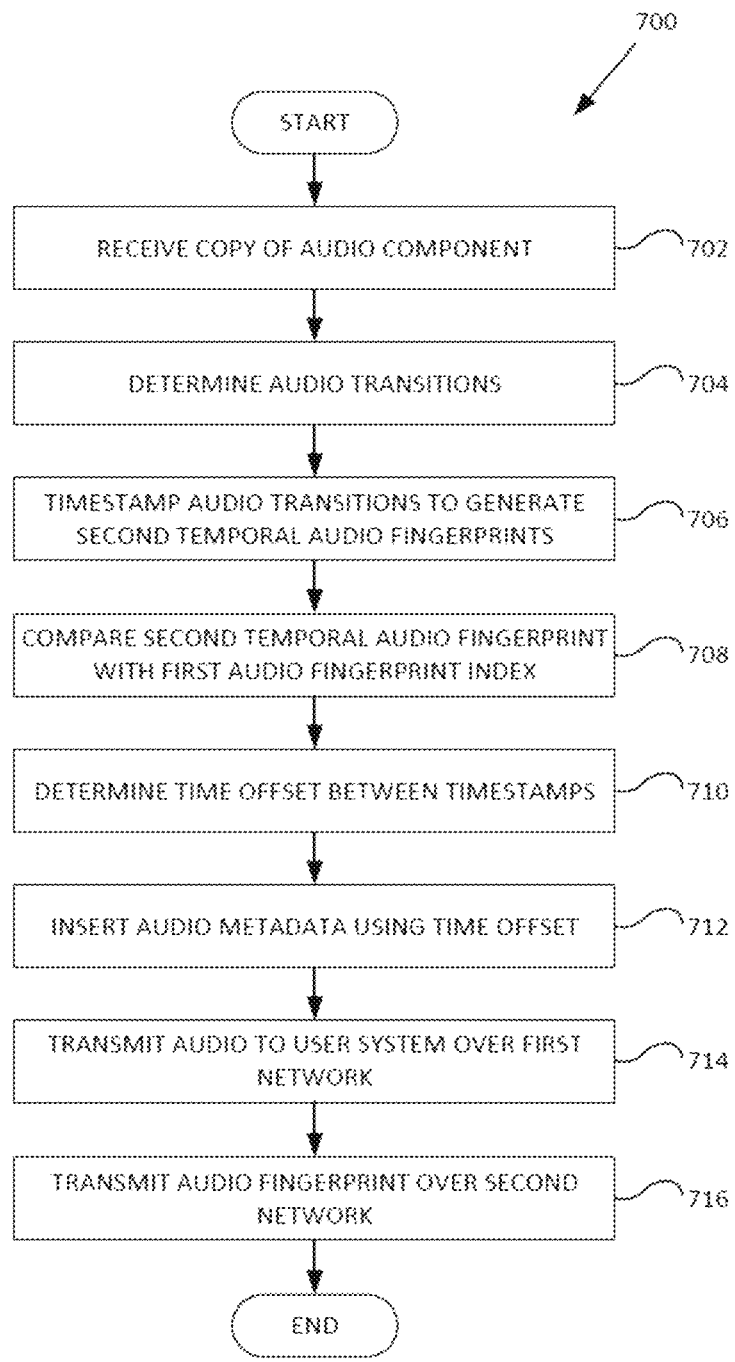
FIG. 7 depicts a flowchart of an audio broadcasting method of the second broadcast server according to some embodiments.

FIG. 7 depicts a flowchart of a second audio broadcasting method 700 of second broadcast server 104 according to some embodiments. In step 702, the second broadcast system 104 may receive the audio data from the first broadcast system 102.

In step 704, the transition detection engine 306 may scan through the audio data (or an audio component of audio/video data) to identify audio transitions. The transition detection engine 306 may identify audio transitions by scanning through any portion of the audio component of the audiovisual broadcast. In various embodiments, the audio component of the audiovisual broadcast may be transmitted to user system 110 over the first network at any time before or after transition detection engine 306 identifies audio transitions. Similar to step 504 of first audio broadcasting method 500, the transition detection engine 306 may detect the same audio transitions in step 704. For example, the transition detection engine 306 may detect audio transition 'A'

Once an audio transition has been detected, the timing engine 308 may retrieve the current time according to the GPS clock to timestamp the audio transition. The timing engine 308 or the transition detection engine 306 may receive the current time and associated the received time to generate a temporal audio fingerprint. For example, the timing engine 308 may receive the request from transition detection engine 306 of audio transition 'A' and send the current time of X4+Y2. Where Y2 represents the time elapsed between when the first broadcast system 102 detected the audio transition, the first broadcast system 102 generated the temporal audio fingerprint, the first broadcast system 102 packaged the temporal audio fingerprint with the network identifier, the first broadcast system 102 transmitted the package to second broadcast system 104, and the second broadcast system 104 detected the audio transition and generate the temporal audio fingerprint.

For live audiovisual broadcast, the time elapsed may represent the transmission and processing time of the audio and/or video content. For on-demand broadcast, the user system 110 may select audio and/or video content when they choose rather than at the specific broadcast time. Y2, in this case, represents the time elapsed to process the audio and/or video content as well as the time between the original broadcast and when the user chooses to access the audio and/or video content.

In step 708, the comparison engine 314 compares the temporal audio fingerprint received from first broadcast system 102 with temporal audio fingerprints generated from the transition detection engine 306. In some embodiments, the comparison engine 314 may require some number of consecutive matches between temporal audio fingerprints from the first broadcast system 102 and the temporal audio fingerprints from the second broadcast system 104. As discussed herein, matching timestamp deltas may be used to determine the time offset of the audio component of the audiovisual broadcast. A timestamp delta may be the time difference between consecutive temporal audio fingerprints.

In step 710, the comparison engine 314 may determine the time offset between the temporal audio fingerprint from the first broadcast system 102 and the second broadcast system 104.

Once the time offset has been determined, audio metadata may be inserted into the audio component of the audiovisual broadcast in step 712. The second broadcast system 104 may insert an audio according to the audio metadata sent by the first broadcast system 102. In other embodiments, the second broadcast system 104 may replace an entry from the audio metadata with audio chosen by the second broadcast system 104. In some embodiments, audio metadata may point to an audio file stored in network-based storage 108. In other embodiments, audio metadata may include a hyperlink or the like.

In step 714, the audio component of the audiovisual broadcast may be transmitted over the first network to user system 110. In some embodiments, after transition detection engine 306 detects an audio transition, such as in step 704, the section of audio that has already been scanned may be transmitted over the first network. In various embodiments, the first network may include satellite communications provided by satellite system 106. In other embodiments, the first network may include wired or wireless computer network.

In step 716, the temporal audio fingerprint and audio metadata may be optionally transmitted over the second network to network-based storage 108.

The second broadcast system 104 may complete scanning of all or a portion of the audio component of the audiovisual broadcast, may identify the audio transitions, and may package the audio fingerprints and audio metadata.

Figure 8:
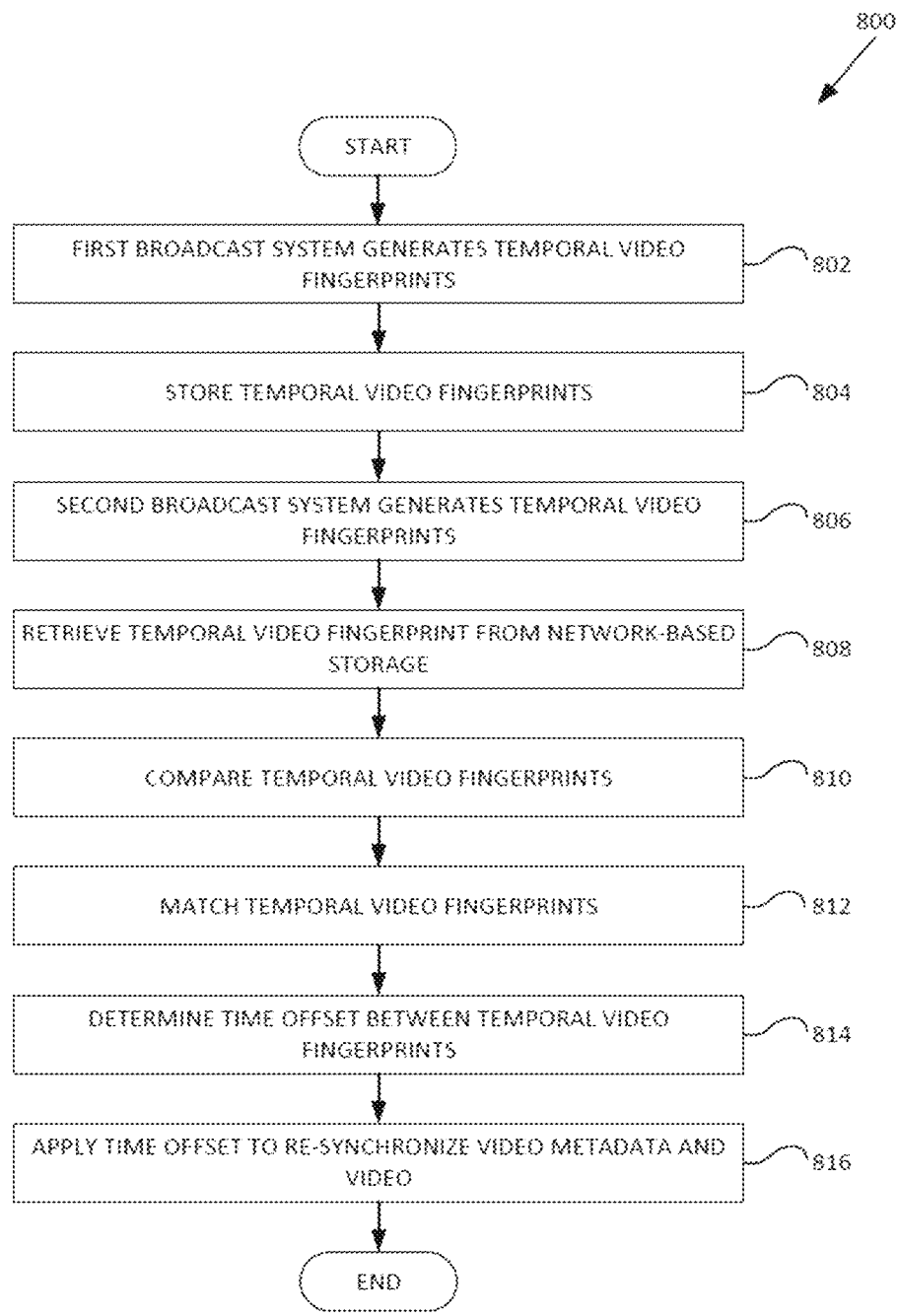
FIG. 8 depicts a flowchart of re-synchronization of video method of the second broadcast server according to some embodiments.

FIG. 8 depicts a flowchart of re-synchronization of video method 800 of the second broadcast server 104 according to some embodiments. In step 802, the first broadcast system 102 generates temporal video fingerprints. This is similar to steps 404, 406, 408 and 412 of first video broadcasting method 400 of FIG. 4. The transition detection engine 206 of the first broadcast system 102 may scan through any portion of the video component of the audiovisual broadcast to identify video transitions. When a video transition is detected, the transition detection engine 206 may send a request to the timing engine 208 for the current time according to the GPS clock to timestamp the video transition. The timing engine 208 may receive this request and transmit the current time to the transition detection engine 206. The transition detection engine 206 may receive the current time and associate the received time to generate the temporal video fingerprint. The packet engine 210 may package the video transition, timestamp and network identifier together.

In step 804, the communication engine 204 may transmit the temporal video fingerprint to network-based storage 108.

In step 806, similar to step 802, the second broadcast system 104 generates temporal video fingerprints. This is similar to steps 604, 606, 608 and 612 of second video broadcasting method 600 of FIG. 6. The transition detection engine 306 of the second broadcast system 104 may scan through any portion of the video component of the audiovisual broadcast to identify video transitions. When a video transition is detected, the transition detection engine 306 may send a request to timing engine 308 for the current time according to the GPS clock to timestamp the video transition. The timing engine 308 may receive this request and transmit the current time to the transition detection engine 306. The transition detection engine 306 may receive the current time and associate the received time to generate the temporal video fingerprint. The packet engine 310 may be configured to package the video transition, timestamp and network identifier together.

As the second broadcast system 104 generates video temporal fingerprints, the second broadcast system 104 may retrieve temporal video fingerprints from network-based storage 108 over the second network in step 808.

In step 810, the comparison engine 314 compares the temporal video fingerprint received from first broadcast system 102 with temporal video fingerprints generated from transition detection engine 306 to find video fingerprints that match for synchronization.

In step 812, the comparison engine 314 may match temporal video fingerprints. In some embodiments, the comparison engine 314 may require some number of consecutive matches between temporal video fingerprints from first broadcast system 102 and second broadcast system 104 with matching timestamp deltas to determine the time offset of the video component of the audiovisual broadcast.

In step 814, the comparison engine 314 determines the time offset between the temporal video fingerprint(s) from first broadcast system 102 and the temporal video fingerprint(s) generated by second broadcast system 104.

In step 816, the media engine 316 utilizes the time offset to re-synchronize the video metadata and video component on the second broadcast system 104.

Figure 9:
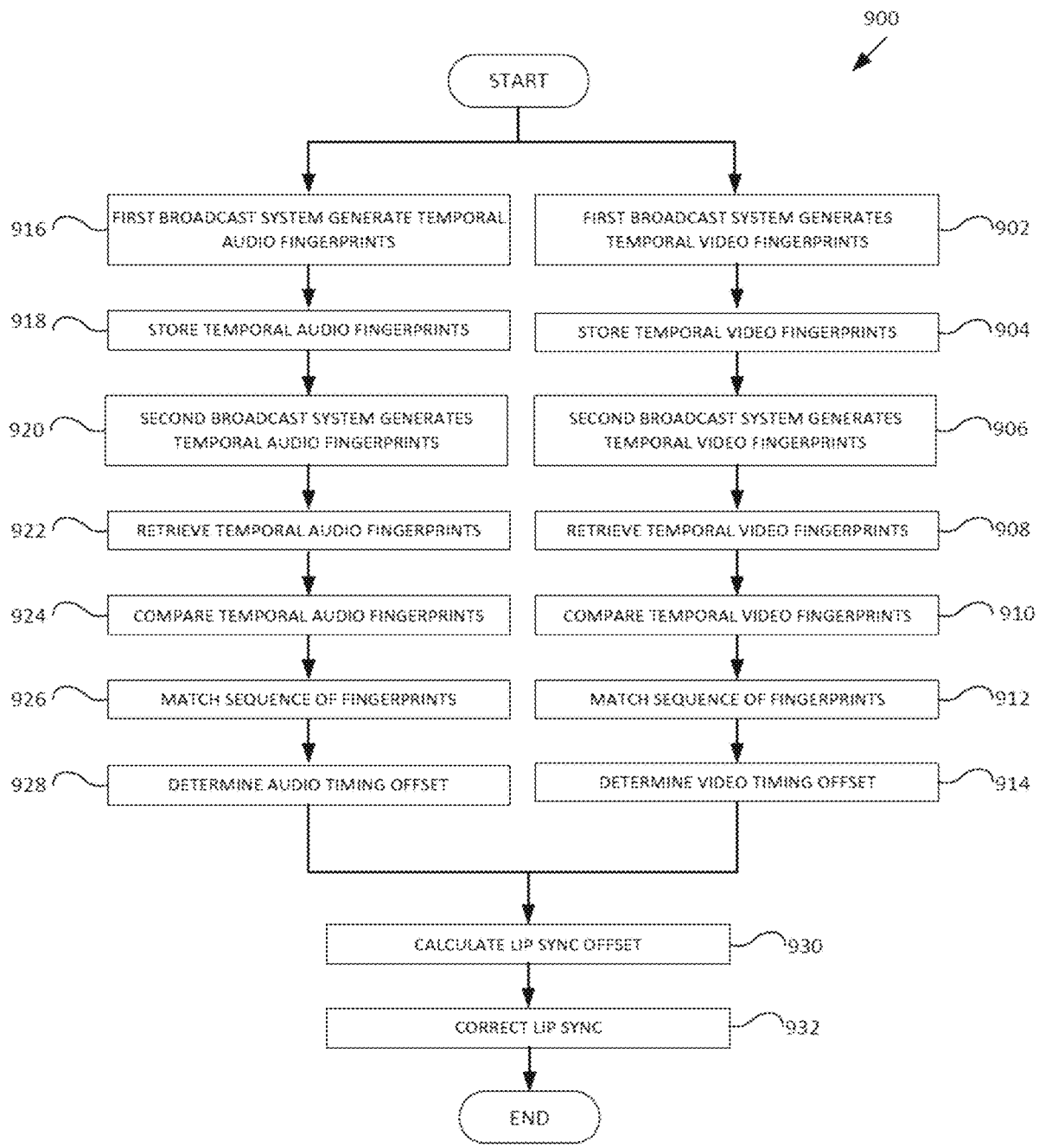
FIG. 9 depicts a flowchart of correcting lip sync method of the second broadcast server according to some embodiments.

FIG. 9 depicts a flowchart of correcting lip sync method 900 of the second broadcast server 104 according to some embodiments. Steps 902 thru 914 are similar to those of steps 802 thru 814 of FIG. 8. For example, in step 902, the first broadcast system 102 receives audiovisual broadcast (e.g., video data with audio) and generates temporal video fingerprints. The transition detection engine 206 of the first broadcast system 102 may scan through any portion of the audiovisual broadcast to identify video transitions. When a video transition is detected, the timing engine 208 may retrieve a time according to the GPS clock to timestamp the video transition. The timing engine 208 or the transition detection engine 206 may generate the temporal video fingerprint.

In step 904, the communication engine 204 may transmit the temporal video fingerprint to network-based storage 108.

In step 906, the second broadcast system 104 generates temporal video fingerprints. This is similar to steps 604, 606, 608 and 612 of second video broadcasting method 600 of FIG. 6. The transition detection engine 306 of the second broadcast system 104 may scan through any portion of the video data to identify video transitions. When a video transition is detected, the timing engine 308 may retrieve the current time according to the GPS clock to timestamp the video transition. The timing engine 308 or the transition detection engine 306 may utilize the time retrieved by the timing engine 308 to generate the temporal video fingerprint.

As the second broadcast system 104 generates video temporal fingerprints, the second broadcast system 104 may retrieve temporal video fingerprints from network-based storage 108 over the second network in step 808.

In step 910, the comparison engine 314 compares the temporal video fingerprint received from first broadcast system 102 with temporal video fingerprints generated from transition detection engine 306 to find video fingerprints that match for synchronization.

In step 912, the comparison engine 314 may match temporal video fingerprints. In some embodiments, the comparison engine 314 may require some number of consecutive matches between temporal video fingerprints from first broadcast system 102 and second broadcast system 104 with matching timestamp deltas to determine the time offset of the video component of the audiovisual broadcast.

In step 914, the comparison engine 314 determines the time offset between the temporal video fingerprint(s) from first broadcast system 102 and the temporal video fingerprint(s) generated by second broadcast system 104.

In step 916, the transition detection engine 206 may scan through the audio component of the audiovisual broadcast to identify audio transitions. The timing engine 208 may retrieve the time according to the GPS clock to timestamp the audio transition. The timing engine 208 and/or the transition detection engine 206 may utilize the retrieved time to generate a temporal audio fingerprint.

In step 918, the communication engine 204 may be configured to transmit the temporal audio fingerprint to network-based storage 108.

In step 920, similar to step 916, the second broadcast system 104 generates temporal audio fingerprints. This may be similar to steps 704, 706, 708 and 712 of second audio broadcasting method 700 of FIG. 7. The transition detection engine 306 of second broadcast system 104 may scan through any portion or all of the audio component of the audiovisual broadcast to identify audio transitions. When an audio transition is detected, the timing engine 308 for the current time according to the GPS clock to timestamp the audio transition. The timing engine 308 or the transition detection engine 306 may utilize the retrieved time to generate the temporal audio fingerprint.

As the second broadcast system 104 generates audio temporal fingerprints, second broadcast system 104 may retrieve temporal audio fingerprints from network-based storage 108 over the second network, as seen in step 922.

In step 924, the comparison engine 314 compares the temporal audio fingerprint received from first broadcast system 102 via network-based storage 108 with temporal audio fingerprints generated from transition detection engine 306 to find audio fingerprints which match.

In step 926, the comparison engine 314 may match temporal audio fingerprints. In some embodiments, the comparison engine 314 may require some number of consecutive matches between temporal audio fingerprints from the first broadcast system 102 and the second broadcast system 104 with matching timestamp deltas to determine the time offset of the audio component of the audiovisual broadcast.

In step 928, the comparison engine 314 determines the time offset between the temporal audio fingerprint from the first broadcast system 102 and the second broadcast system 104.

In step 930, the comparison engine 314 takes the video timing offset determined in step 914 and audio timing offset determined in step 928 to calculate the lip synchronization offset.

In step 932, the second broadcast system 104 corrects the lip synchronization utilizing the lip synchronization offset.

In the presented embodiments, the audiovisual broadcast system 100 includes two broadcast systems. In other embodiments, the audiovisual broadcast system 100 may include three or more broadcast systems which may function similarly to first broadcast system 102 or second broadcast system 104.

Figure 10:
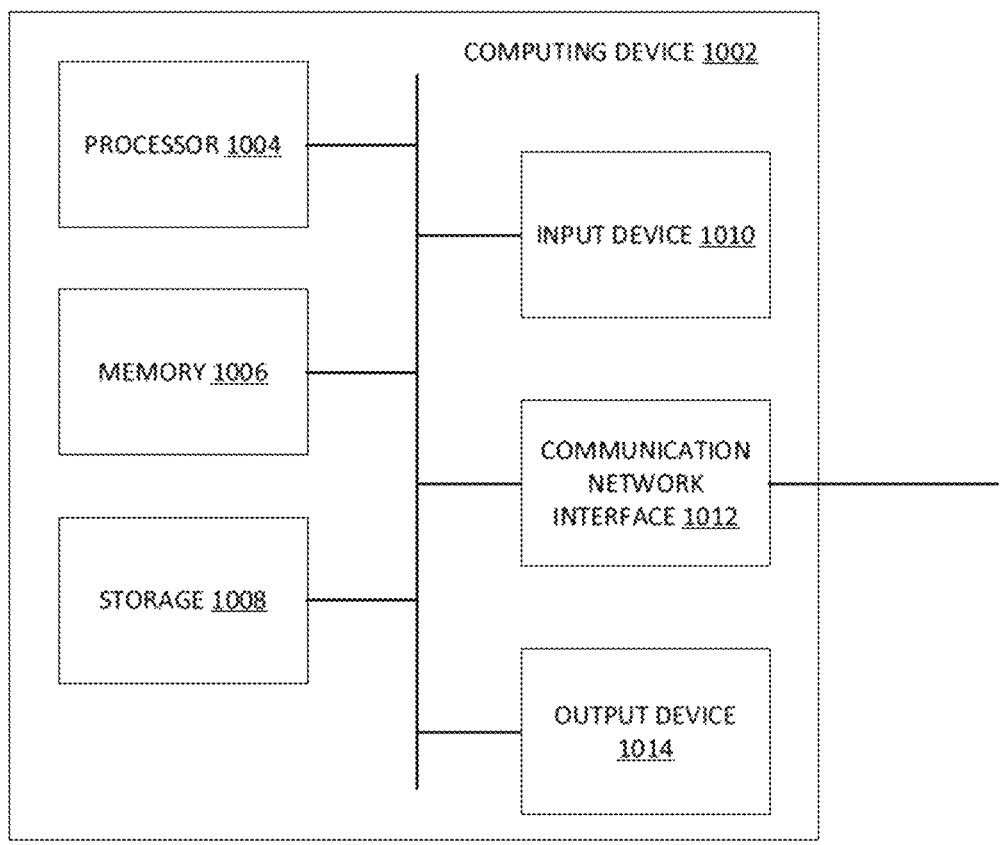
FIG. 10 depicts a block diagram of an example a digital device according to some embodiments.

FIG. 10 depicts a block diagram of an example a digital device 1002 according to some embodiments. Any user system 102 may comprise an instance of a digital device 1002 (e.g., a computing device). The digital device 1002 comprises a processor 1004, memory 1006, storage 1008, an input device 1010, a communication network interface 1012, and an output device 1014.

The processor 1004 may be configured to execute executable instructions (e.g., programs). In some embodiments, the processor 1004 comprises circuitry or any processor capable of processing the executable instructions.

The memory 1006 stores data. Some examples of memory 1006 include storage devices, such as RAM, ROM, RAM cache, virtual memory, etc. In various embodiments, working data is stored within memory 1006. The data within memory 1006 may be cleared or ultimately transferred to storage 1008.

The storage 1008 includes any storage configured to retrieve and store data. Some examples of the storage 1008 includes flash drives, hard drives, optical drives, and/or magnetic tape. Each of memory system 1006 and the storage system 1008 may comprise a computer-readable medium, which stores instructions or programs executable by processor 1004.

The input device 1010 is any device that inputs data (e.g., mouse, keyboard, stylus).

The output device 1014 outputs data (e.g., speaker, display, virtual reality headset). It will be appreciated that the storage 1008, input device 1010 and output device 1014 may be optional. For example, routers/switchers may comprise processor 1004 and memory 1006 as well as a device to receive and output data (e.g., communication network interface 1012 and/or output device 1014).

The communication network interface 1012 may be coupled to a network (e.g. network-based storage 108 or satellite system 106) via a communication network interface 1012. The communication network interface 1012 may support communication over an Ethernet connection, a serial connection, a parallel connection, and/or an ATA connection. Communication network interface 1012 may also support wireless communication (e.g., 1102.11a/b/g/n, WiMax, LTE, WiFi). It will be apparent that communication network interface 1012 may support many wired and wireless standards.

An engine may be hardware or software. In some embodiments, the engine may configure one or more processors to perform functions associated with the engine. Although different engines are discussed herein, it will be appreciated that the server system 106 may include any number of engine performing any or all functionality discussed herein.

According to the present invention, received video streams at an input port of a video production system' processing component for example at a video ingest node such as a server are augmented by correction of incorrect information conveyed by metadata in the received video streams before augmented video streams are transported or otherwise distributed over a network to a consumer node or another video processing component. This is because metadata messages in the received video streams can convey wrong timing information. For example, such wrong timing information can sometimes reference or address an incorrect location or position of video frames contained in the received streams, which is likely to result in disjointed video switches because the switching occurs on a wrong video frame. This can happen as a result of delays and inaccuracies, or other errors that occur during processing of the video streams.

As described in connection with FIGS. 1-10, incorrect insertion of metadata with specific points in time in incoming audiovisual signals streams containing multi-media content can be corrected by detecting changes or transitions in the audiovisual signal itself. While streamed multi-media content contains both video and audio data, such streaming is often referred to as video streaming or streaming with the understanding that streams carry both video and audio data. This specification refers to multi-media streaming, video streaming and streaming interchangeably.

Under one arrangement, a received stream carrying content is augmented by being processed or otherwise scanned at a video processing component of a production system to 1) determine timings of conveyed metadata in the received streams associated with video frames in the received stream and 2) create temporal video fingerprints representing values that contain time information for each of a set of visual transitions of significance, such as scene changes which can be determined based on video frame attributes, e.g., chroma/luma/color values. As used herein, a temporal video fingerprint references or otherwise addresses a metadata item conveyed in an augmented stream. A set of metadata items is associated with a set of metadata indexes to reference or address video frames with corresponding temporal video fingerprints, which can be any value derived from attributes assigned to the visual signal itself. In this way, metadata can be synchronized with video content correctly using temporal video fingerprints which reference or address video frames where scene changes occur. For example, when one continuous camera shot or video frame sequence ends and another begins, drastic inter-picture change is introduced between two adjacent video frames, which is identified as a scene change.

Because most useful metadata such as the start of a program, the start of an ad break or the start of an individual advertisement takes place with a scene change, inaccurate or erroneous associations of metadata can be corrected by detecting scene changes and comparing them with conveyed metadata timing associations or assertions in the received streams before conveying the streams with correct metadata timing associations or assertions. In one embodiment, metadata can be synchronized with audiovisual content using temporal fingerprints without the metadata being carried in-band with the stream. Instead, the metadata can be delivered to a destination node out-of-band before the stream arrives. This is because the amount of transmitted out-of-band metadata is small compared to much larger amount of video stream which has to be processed (i.e. compressed) before distribution which adds seconds of delay to the propagation time. Therefore using temporal fingerprinting in addition to scene change detections means that as long as the processing and propagation delay of the video is longer than the scene change detection plus the propagation of the out of band metadata, errors in metadata timing assertions can be corrected based on the fingerprints without any additional delay to the video being added. In other words, the video data itself does not need to be transmitted along with the temporal fingerprints. Instead, out of band temporal fingerprinting can be used to detect transitions in order to correct mis-timed metadata.

Accordingly, a method for transmitting a stream that contains video content from a source node to a destination node receives the stream at the source node. The stream is scanned for visual transitions of significance within the video content. The method creates temporal video fingerprints that indicate scene changes in the video content based on the visual transitions of significance. Metadata is then associated with the temporal video fingerprints, before transmitting the stream to the destination node in-band. The metadata associated with the temporal fingerprints, however, is transmitted to the destination node out-of-band channel. The video stream and the set of temporal video fingerprints and the metadata index can be either transmitted over the same channel, e.g., a cable channel or different channels, e.g., a satellite channel and a terrestrial channel. A timestamp associated with each visual transition can be used to determine a delay at the one or more destination nodes, where the delay is used to synchronize items of metadata associated with specific frames at the one or more source nodes with items of metadata associated with the same specific frames at the one or more destination nodes.

Moreover, in another example, a video stream that contains video content comprising frames associated with metadata is received at a node, where the video content is scanned for transitions between consecutive frames such that each transition indicates significant visual transition relative to other frames of the video data, for example a scene change. Under this arrangement, the video stream is also scanned for identified metadata associated with one or more specific frames, where the association of the identified metadata to the same one or more specific frames is modified based on significant visual transitions such that the modification synchronizes metadata associated with specific frames at one or more source nodes with metadata associated with the same specific frames at one or more destination nodes.

Another embodiment of the invention described in connection with FIGS. 11-14 relates to a system and method for augmenting received streams made up of a series of video frames using frame-accurate markers inserted at a source node that convey information for correctly placing content in augmented streams received at a destination node. Among others, examples of markers used in the present invention include watermarks and markers that use formats standardized by the Society of Cable Telecommunications Engineers (SCTE), the Society of Motion Picture and Television Engineers (SMPTE) or the Moving Picture Experts Group (MPEG) as further described below. Such markers contain metadata carrying messages indicative of timing, location, position or address of a video frame that direct content placement, such as ad placement. As used herein, a marker can be any readable information used in a video stream, e.g., timing, name, type, identification code (ID). Such marker conveys frame accurate readable information in metadata messages. The markers contain metadata that can convey various information in messages used to synchronize metadata at a destination node that receives conveyed streams originated at a source node. In one example, markers contain metadata comprising messages that convey timing information used to accurately place content in correct video frames at the destination node. A frame accurate marker can be used to augment the received streams, for example, to enable addressable advertising. This arrangement can use digital video processing to determine the timeline of a received video stream in order to frame-accurately associate or re-associate marker metadata with video frames in a corresponding augmented video stream at the destination node. In another example, markers contain metadata to identify an upcoming segment of audiovisual content such as an advertisement or group of advertisements ("an ad break") in advance so that an ad decision system can determine suitable replacement content.

The method executed by the present invention requires identifying frames in a stream for placement of content, such as an advertisement, before generating a frame-accurate marker for an identified frame. Such marker is associated with a timestamp from an accurate time reference. Sequences of markers and their associated timestamps from a source node at a transmit location are read at destination nodes at receive locations in order to determine a transmission delay between the transmit location and each individual receive location. In this way, a video transmission and/or storage delay between a remote client and a transmitted video component or content of communicated by the streams can be used to correct metadata at a destination node. This method can be used to re-synchronize metadata at any receive location with that of a transmit location or synchronize other data with streams taking into account the dynamically measured transmission and/or storage delay of the stream between the source node and each destination node based on the markers. The system continuously measures the difference in transmission and/or storage delays for the video component of the streams between the source node at a transmit site and one or more destination nodes at corresponding receive locations/sites. This measure indicates exactly what content was delivered to one or more destination nodes and when. For example, the present invention can be used in conjunction with the playlist or schedule of a broadcast system to synchronize metadata or other data from external sources with the broadcast at on one or more separate devices for the purposes of creating a synchronized interactive capability with the broadcast.

Watermarking formats have been used for copyright protection and asset tracking. A watermark is known as a kind of marker that is covertly or overtly embedded in a noise-tolerant signal in a video frame or image data. Such watermark can be opaque or transparent so as to not interfere with an image conveyed by the video frame itself. Since watermarks are modifications to individual video frames, their association to the timing of the video essence is necessarily frame accurate.

Figure 11:
FIG. 11 shows a transmit stream conveyed by a source node of and a receive stream in a destination node containing markers embedded in a source node conveying timing information used to determine propagation delays at a destination
Figure 11:

FIG. 11 shows a transmit stream conveyed by a source node of a network and a receive stream in a destination node of the same network include watermarks inserted in video frames. Watermarks can be applied to occur on one or a sequence of frames. A watermark can overlap a video frame where it can cover the entire dimension of the video frame, sit in the center of the video frame, or rest neatly in one of the corners of the video frame or occupy a whole or part of one or more lines in the frame. Such watermark inserted into the streams at a source node can be used to synchronize content placement at a destination node, which reads conveyed synchronization information in the watermark. Each watermark conveys timing information for example using time stamps A-D. The timing information can be derived from a source time reference at the source node, e.g., a GPS clock. A destination time reference, e.g., the GPS clock, at the destination node is used to determine propagation delays E-H based on time stamps A-D. For example, assuming time stamps A-B respectively convey conveys times T0 for watermark A, T1 for watermark B, T2 for watermark C and T3 for watermark D, the reception time of watermark A would be T0+Delay E, the reception time of watermark B would be T1+Delay F, the reception time of watermark C would be T2+Delay G, the reception time of watermark D would be T3+Delay H. Since the times T0–T3 are conveyed by time stamps in watermarks A-D, the delays E-F can be determined at the destination based on the destination node time reference. These delays are then used to is used to synchronize metadata associated with specific frames at the source node with metadata associated with the same specific frames at the destination node. In the arrangement shown in FIG. 11, the watermarks are transmitted with the stream in-band.

In another embodiment, the generated markers at the source node contain metadata comprising messages conveying timing information transmitted out-of-band. Such timing information can be used to address correct video frame locations or positions at destination nodes. According to one embodiment, metadata is associated with a video stream at the source node. The source node then transmits to the destination node the video stream in-band and the associated metadata out-of-band, where the metadata is received at the destination node before the video arrives. When the video arrives at the destination node the received metadata can be inserted frame accurately based on conveyed timing information. In this case, the received metadata at the destination node can be fingerprints or markers, e.g., SCTE markers, etc.

In still another embodiment, a used marking format according to the present invention generates markers that contain metadata messages conveying frame correction information in the augmented streams at a source node where a watermark is used to correct the timing of incorrectly inserted metadata, such as SCTE markers in audiovisual content. Such frame correction information provided by a source node can be derived based on configurations specified by a system administrator or an operator of a production system that controls programming of content.

During production of programs according to the present invention, timing information provided by markers and temporal video fingerprints can be used alone or together in the augmented streams. A program can be any one or combination of streamed content used for consumption by any audience, user, viewer, subscriber, etc. Systems used in production, post-processing, and distribution of programs through streaming are known. Also known are streaming services used for delivering video/audio data to consumers via the Internet (or other networks). Typically, these services employ media servers that divide programs into segments, encode each segment, and transport encoded segments to client devices over a wide variety of transport protocols. The client devices receive the transported segments, decode the segments, and present the decoded segments in appropriate formats to consumers, including viewers of multi-media streams. Video and audio codec formats refer to technologies used to both create and play back digital video and audio. Each format specifies how video and audio is combined. Video transcoding, sometimes called video encoding, is conversion from one digital encoding format to another, such as for movie data files. Video transcoding involves translating three elements of a digital video at the same time—the file format, the video, and the audio. A video engine is underlying code used to support High Definition (HD) recording, playback, and editing.

Video on demand (VOD) is a known distribution service employed by such companies as Netflix, Apple, etc. who are owners or publishers of streams conveyed to subscribers. VOD allows such subscribers to access multi-media streams without the constraints of static broadcasting schedules. Also known is live streaming of public or private programs where content originated at venues, such as stadiums, offices, concert halls, TV studios, etc. are transmitted to viewers in real time using the Internet. In streaming deployments that use the Internet Protocol (IP), it is known to route packetized streams for production before distributing the produced streams to viewers. Such production can involve insertion of information or metadata used to augment, identify, enrich, change, modify or qualify types of the streams, including by for example inserting adverts, closed captioning or other content in specific video frames.

Live streaming can, for example, be implemented over the Internet using systems and methods disclosed in U.S. Pat. No. 8,599,851 issued to Amir et al. titled "System and method that routes flows via multicast flow transport for groups"; U.S. Pat. No. 8,437,267 issued to Amir et al. titled "System and method for recovery of packets in overlay networks"; U.S. Pat. No. 8,619,775 issued to Amir et al. titled "Scalable flow transport and delivery network and associated methods and systems"; U.S. Pat. No. 9,106,569 issued to Amir et al. titled "System and method that routes flows via multicast flow transport for groups"; and U.S. Pat. No. 8,181,210 issued to Amir et al. titled "Method for delivery of deadline-driven content flows over a flow transport system that interfaces with a flow delivery system via a selected gateway." These patents which are owned by LTN Global Communications, Inc. of Columbia, Md., the assignee of the present application, are hereby incorporated by reference.

When streams are communicated between a source node and a destination node, they encounter a slew of transport obstacles like bandwidth fluctuations, packet losses, etc., which degrade streaming quality. Various transport protocols have been developed to improve the quality. For example, SRT is a transport protocol that delivers high-quality streams at low latency over noisy networks like the Internet. The protocol optimizes transport of streams over unpredictable networks by adapting to network conditions, minimizing packet loss and creating a better viewing experience.

Hypertext Transfer Protocol (HTTP) Live Streaming (HLS) is an HTTP-based adaptive bitrate streaming communications protocol developed by Apple for implementation using web browsers executed in clients' devices. For example, when a client requests a stream such as by a click on a hyperlink, a browser sends a request message to a HTTP server for the requested stream. The server receives the request and sends a response message with the stream to the browser. However, the HTTP server maintains no information about the client, and if the client asks for the same stream again, the server resends the stream. For this reason, HTTP is called a stateless protocol. HTTP can use both non-persistent or volatile connections and persistent connections. A volatile connection is a connection that is closed after a HTTP server sends a requested stream to a client. In other words, the connection is used for one request and one response. With persistent connections, the HTTP server leaves the connections open after sending the response and hence subsequent requests and responses between the same client and server can be exchanged. The server closes a connection only when it is not used for a certain configurable amount of time. HLS works by breaking the overall stream into a sequence of small HTTP-based file downloads, each download containing one short chunk of an overall potentially unbounded stream.

Real-time Transport Protocol (RTP) is a network protocol for delivering streams over IP networks. RTP is used in communication and entertainment systems that involve streaming and video teleconferencing. RTP typically runs over User Datagram Protocol (UDP). RTP is used in conjunction with the RTP Control Protocol (RTCP). While RTP carries the streams, RTCP is used to monitor transmission statistics and quality of service (QoS) and aids synchronization of multiple streams. Real Time Streaming Protocol (RTSP) is a network control protocol designed for use in entertainment and communications systems to control media servers. The protocol is used for establishing and controlling media sessions between endpoints. The transmission of streaming video/audio data itself is not a task performed by RTSP. Most RTSP servers use the RTP in conjunction with RTCP for streaming. One application of RTP is in Web Real-Time Communication (WebRTC), a free, open-Source project that provides web browsers and mobile applications with real-time communication (RTC) via application programming interfaces (APIs). It allows for streaming inside web pages using direct peer-to-peer communication, thereby eliminating the need to install plugins or download native applications.

MPEG-2 transport stream [ISO/IEC 13818-1] (also known as transport stream, MPEG-TS, MPTS or TS) is a standard digital container format for transmission and storage of audio, video, and Program and System Information Protocol (PSIP) data. TS Streams, include Program Specific Information (PSI), can be transported over any packet switched network or broadcast medium. TS is used by satellite, cable, terrestrial etc. PSI is a set of tables carrying the necessary information to de-multiplex and present programs, such as Program Mapping Table (PMT).

Dynamic Adaptive Streaming over HTTP (DASH), also known as MPEG-DASH, is an adaptive bitrate streaming technique that enables high quality streaming over the Internet. MPEG-DASH can be delivered from conventional HTTP web servers. Like HLS, MPEG-DASH works by breaking the content into a sequence of small HTTP-based file segments with each segment containing a short interval of playback time of content that is potentially many hours in duration, such as a movie or the live broadcast of a sport events. The content is made available at a variety of different bit rates, where alternative segments are encoded at different bit rates covering aligned short intervals of playback time. MPEG-DASH allows devices like Internet-connected televisions, TV set-top boxes, desktop computers, smartphones, tablets, etc. to consume multi-media content delivered over Internet, thereby coping with variable Internet receiving conditions.

Figure 12:
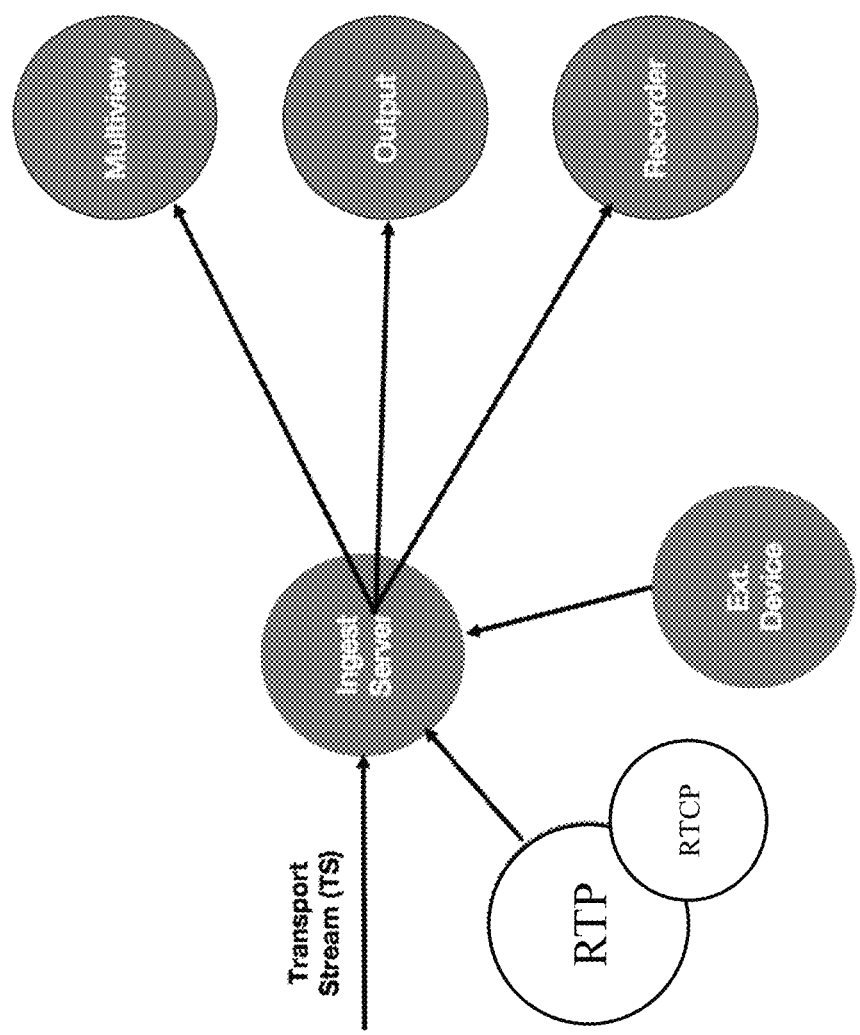
FIG. 12 depicts a block diagram of an example implementation of content delivery in a video production system that uses markers described according to another embodiment of the invention for augmenting received video streams that improves content placement in streams.

FIG. 12 shows implementation of content delivery in a video production system, which receives streams, for example, bounded TS streams for programs, or unbounded RTP-RTCP streams, or streams from an external device. These received or incoming streams are ingested by media servers known as ingest servers. According to the present invention, the ingested streams are augmented using frame accurate markers and/or temporal video fingerprints at source nodes before being sent to destination nodes in-band or out-of-band. Such destination nodes can be output devices, recorder devices or multi-view devices. For video production, various systems, platforms, hardware, software, networks, facilities, etc., are required to develop, test, deliver, monitor, control or support streaming. In one embodiment, the video production is implemented in IT infrastructure, where video streams are "ingested" by bringing them from multiple venues into a production platform. The ingest servers provide user interfaces in a flexible system and method that supports augmentation of streams in the cloud and allows for the extension of the platform without changing its structure. The system supports various transport formats as well as automated routing, monitoring and alerting.

Figure 13:
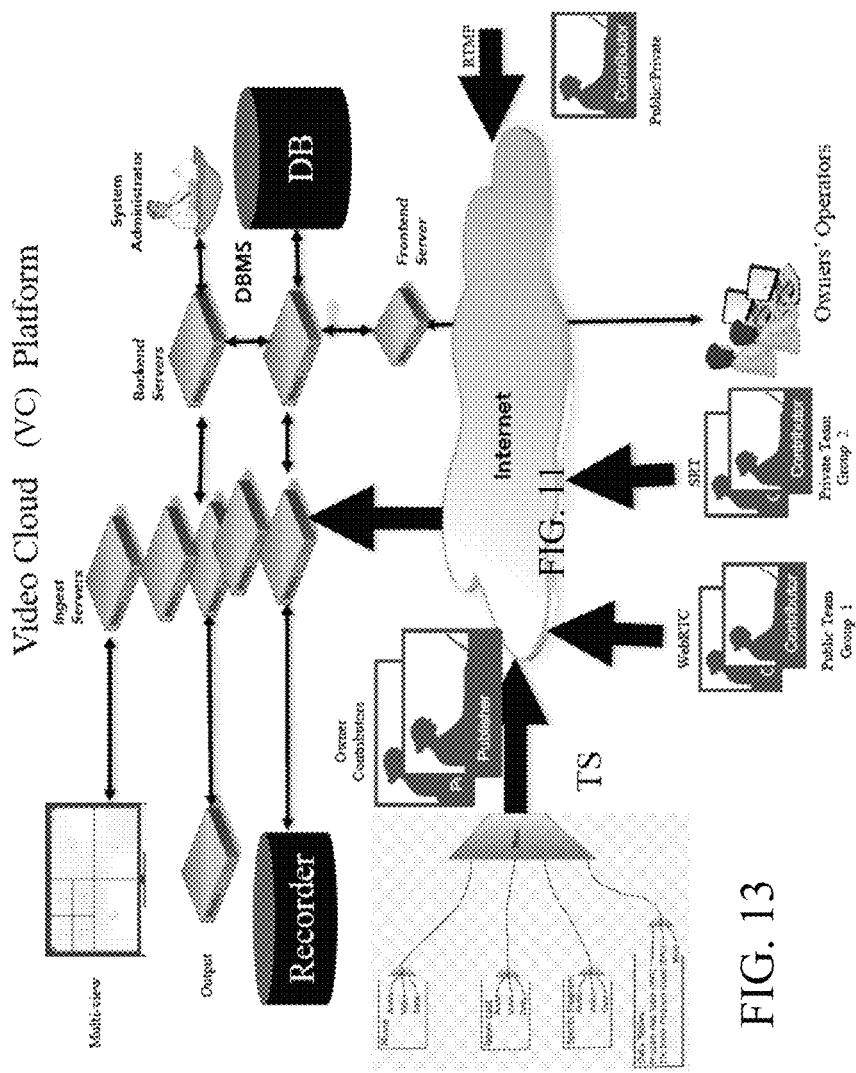
FIG. 13 depicts a block diagram of an example implementation of a Video Cloud (VC) platform.

FIG. 13 shows example implementation of the present invention in a Video Cloud (VC) platform used for production, post-processing, and distribution of programs through streaming. One embodiment of the VC platform can, for example, be implemented over the Internet using systems and methods is disclosed in a provisional application owned by the assignee of the present application, namely, the U.S. provisional application No. 63/018,969 filed on May 1, 2020, titled "A System and Method That Uses Cloud Computing for Production of Programs Represented by Multi-Media Streams", which is hereby incorporated by reference.

The VC platform is managed by a system administrator who controls access to databases as well as backend and frontend servers that form a database management system (DBMS) over a cloud computing network that includes the Internet. Such databases contain configuration information used to augment streams according to the present invention. The VC platform provides automated multi-media routing over various streaming formats, while supporting monitoring and alerting during production process.

The VC platform is used by the system administrator and production personnel, i.e., operators assigned by owners or publishers of streams who are given privileges to perform administrative functions. The VC platform is also used by contributors who are given privileges to contribute streams, including owners or publishers of programs. The administrative functions performed by the operators include configuring the VC platform to cause augmentation of received streams at inputs and routing augmented streams to outputs with in-band or out-of-band signaling. The administrative functions performed by the system administrator include controlling user access to the VC platform and managing membership of operators and contributors individually or in teams groups or sub-groups. Users of the VC platform can be production personnel, i.e., operators, as well as contributors of streams to the platform. For example, an operator can be a company doing a production for the owner or publisher of programs. Productions can be created by the operators. In the VC platform, the operators can assign inputs and outputs to a Production. Productions constructs provide structure, filtering, enabling or disabling input ports, and routing to output ports.

As used in this specification, the terms "component," "system," "platform," "device," "entity," "node" and the like can refer to a computer entity or an entity related to an operational machine with one or more specific functionalities, such as encoder or transcoder or marker or fingerprinting functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

FIG. 13 shows video signals in various formats using different transport protocols, e.g., TS, WebRTC, RTMP and SRT, being routed as streams to the ingest servers over the Internet. As shown, teams of contributors contribute WebRTC and SRT streams and a single contributor who is not part of the team contributes an RTMP stream. A published or owner of a program can contribute streams using TS protocol. The ingested streams can be sent to an output device, a recorder device or to a multi-view device, which shows video images in what is known as tiles. In one example using MPEG-DASH over TS, the VC platform identifies various audiovisual object types using a universal unique identifier system known as EIDR, which identifies assets, owners/publishers, titles, edits, and collections, series, seasons, episodes, and clips. The VC platform supports Electronic Programming Guides (EPGs) and Interactive Programming Guides (IPGs). In this example, TS streams that are routed to Ingest Servers include audio/video data and In-band (IB) metadata associated with movies, newscasts, TV and sport programs etc. There are several industry standards well known in the art such as ANSI SCTE 35, ANSI SCTE 104, SMPTE 2010 and SMPTE 2038 that relate to in-band metadata signaling.

Also routed are out-of-band (OOB) metadata, like PMT and EPG and metadata messages used for augmentation of the received streams. Metadata can represent any kind of signaling data for example, signaling frame timings, frame positions or frame addresses, graphical overlays, tickers, events in programs (such as a goal scored in a soccer match), precise timing of events (e.g. start of a program, a chapter, an advert, an ad break, etc.), asset IDs (e.g. EIDR, Ad-ID), closed captions, statistical data about a program, e.g., a game, etc.

Users of the VC platform can access the platform under the control of the system administrator through a portal provided by a frontend server at a URL, where users' log-in IDs and passwords can be entered. Once logged in, the web portal provides interfaces that enable the operators to configure various components of the VC platform to augment input streams according to the present invention. Configurable logical components of the platform are used for setting configurations for producing augmented streams for different contributed steams. Inputs can be persistent entities configured and managed via graphical user interfaces or Application Programing Interfaces (APIs). Each input stream can be associated with a "session tag" that creates a topical connection. Each session tag for streams is created by owner/publisher of streams, who has a unique identification (ID).

The operators manage streams using administration interfaces provided by the frontend server. Under the control of the system administrator, the DBSM manages acceptance or admission of contributed streams and augmenting and routing of outgoing streams, as well as recordings. The ingest servers and the operators determine which streams are selected to be augmented by markers. For live video streaming, the ingest servers allow the operators to manage contributed streams and select the ones that are to be augmented by markers based on configuration information retained by the DBMS, where the backend servers access the database to store and retrieve configuration parameters, IDs, attributes, predicates, routing rules, user profile data, etc.

Configuration predicates can be specified by an operator or the system administrator. In this way, the system administrator or operators can manage sessions before streams are outputted for distribution. The frontend server displays all inputs that are associated with a respective session tag to the operators, who can view and manage stream acceptance and routing and configuration parameters, including functions, conditions, user profiles, e.g., teams, groups, etc. The backend servers enable the operators to assign available input streams to start a broadcast and trigger recording of streams using interfaces provided by the frontend server. In this way, the operators can copy links or embed marker codes to sessions for distribution.

Figure 14:
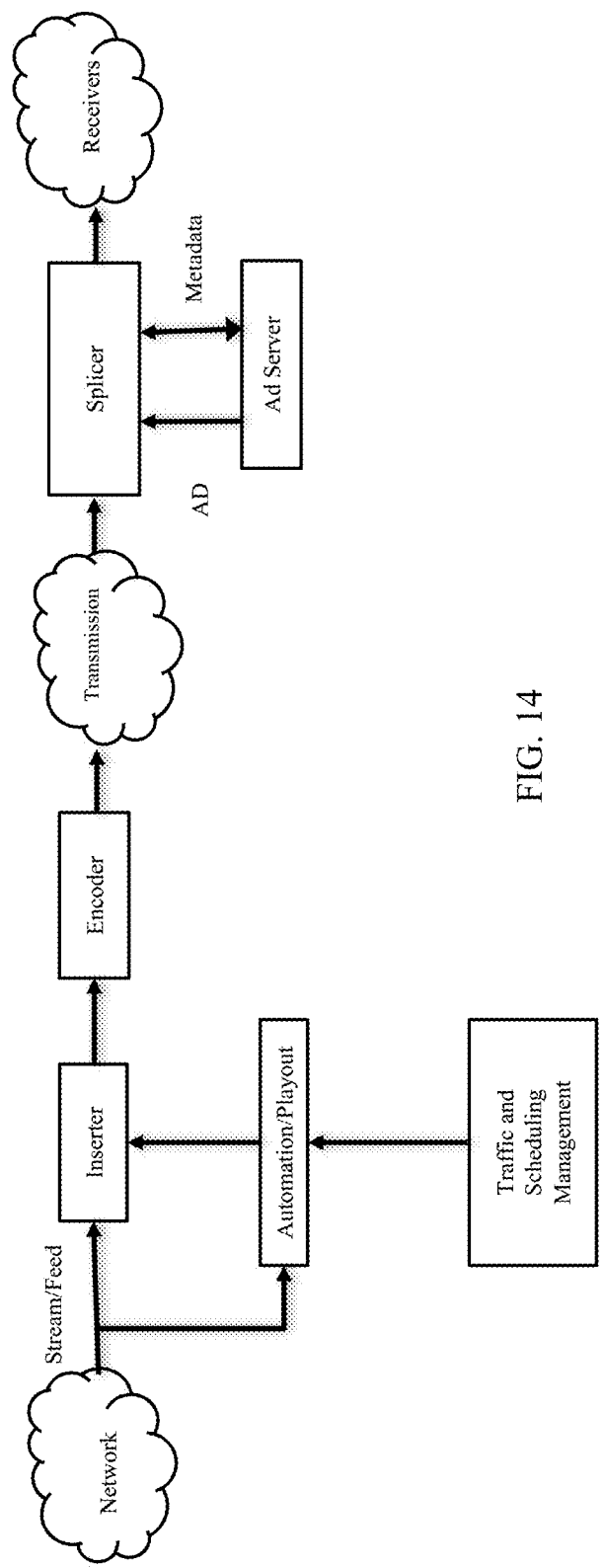
FIG. 14 shows a block diagram of a video delivery system that uses metadata markers to augment received streams at the VC platform.

FIG. 14 shows a block diagram of a video delivery system that uses markers to augment received streams, for example by inserting or replacing advertised content in correct frames. Examples of such markers include video watermarks, SCTE-104 markers, SCTE-35 markers, or any other type of frame accurate marker suitable for correcting metadata placement or replacement errors in video streams.

A SCTE 104 metadata marker can be associated with a specific frame in the audiovisual content by adding a message to a frame. The message can either apply directly to the frame for example, indicating the start of a program or it can be a number of frames in advance of the frame to which it applies (known as pre-roll, which is typically 4-8 second), for example the start of an ad break. A SCTE 35 metadata message in a TS carrying audiovisual content can also be associated with a specific video frame in the audiovisual content by adding a packet to the MPEG-2 Transport stream with a Presentation Time Stamp (PTS) of the video frame to which the metadata applies.

Referring to FIG. 14, a metadata can be implemented in a system in order to insert metadata in watermarks, or SCTE markers used to mark input streams with watermarks that carry data. The data contained in the watermarks can be formatted to contain unique identifiers. Such identified watermarks can be used to re-associate time with video essence frame-accurately and provide basis for frame-accurate association of complete metadata sets. Another logical component of the system can be used to analyze metadata contained in the markers based on various system configurations applied to selected streams. Such analysis of watermarks for example can be used to cause placement or replacement of content, e.g., advertisement, or repositioning of an already inserted marker. As shown in FIG. 14, an incoming stream from a live or recorded video source is applied to the metadata inserter, which is under the control of an Automation/Playout block implemented in a logical system component.

The inserter can insert markers to correct metadata associated with advertisement, closed captioning, etc. In one example, a metadata contained in a watermark can be associated with an event that calls for performance of a function to augment received video streams. For example, the inserted metadata can convey timing information used to correct metadata placement errors, thereby synchronizing content placement between a source node and a destination node. Such metadata can be inserted by the Automation/Playout block into the visible part of the received streams. In an example that uses SCTE markers, the Automation/Playout block marks video frames in the received streams with markers that delimit the advertisement using ancillary data. One such ancillary data is known ANC data, which is standardized by SMPTE. ANC data are non-video information embedded within streams. Ancillary data can be located in non-picture portions of horizontal scan lines. This is known as horizontal ancillary data (HANC). Ancillary data can also be located in non-picture regions of the frame. This is known as vertical ancillary data (VANC). For example, the inserter inserts SCTE-104 markers in the VANC using SMPTE standard.

A Traffic and Scheduling Management block creates the schedule in a playlist running in a broadcast automation system, which associates the start time of a program segment or other events such as an advertisement, closed captions, etc. in a linear video signal by marking an accurate time (either timecode or wall clock time). The output of the metadata inserter is an stream with markers, such as digital watermarks, SCTE that contain temporal information or non-temporal information used to enrich video streaming. According to still another embodiment of the invention, a first set of metadata (e.g. watermarks) is used to correct or insert a second set of metadata that is potentially mistimed (e.g. SCTE) or absent.

For example, watermarks which identify addressable advertising segments are often specific to a single advertising video asset and will change or completely go away once the advertising clip ends. The processes used in the present invention read such watermark and become aware of its intended playout time based on information received from the Playout/Automation block for insertion by Inserter.

In one embodiment, a method for transmitting a video stream that contains video content from one or more source nodes to one or more destination nodes receives the video stream at one or more source nodes and identifies one or more first metadata at the one or more source nodes. The video content comprises consecutive frames where one or more specific frames at one or more source nodes is associated with the identified one or more first metadata. Then one or more second metadata is associated with the one or more specific frames. Each second metadata conveys a timing information relating to a frame associated with a first identified metadata. In one example, the timing information can be derived from a time reference such as a GPS clock at a source node.

The video stream, the identified first metadata and the second metadata is transmitted from the one or more source nodes to one or more destination nodes. The video stream, the first identified metadata and the second metadata is received at the one or more destination nodes, before determining a delay at the at the one or more destination nodes based the timing information conveyed by the second metadata. For example, the timing information can be compared with a time reference at a destination node to determine the delay. Based on the delay, association of the first identified metadata with the one or more frames of the video stream is modified at the one or more destination nodes. The delay can be used to synchronize metadata associated with specific frames at the one or more source nodes with metadata associated with the same specific frames at the one or more destination nodes. The delay can be determined based on a temporal video fingerprint that references the second metadata. Alternatively, the delay can be determined based on a marker that contains the second metadata. The marker can be a watermark or a SCTE mark. In one example, the video stream can be transmitted in-band and the identified first metadata is transmitted out-of-band. On another example, the video stream and the identified first metadata are either transmitted over the same channel or different channels.

In yet another example, SCTE 104 messages may be inserted in the wrong frame of video because the operation of the SCTE 104 injector card is not frame accurate and results in a variance of +/−3 frames of video. Still another example is that the SCTE 35 packets produced during video compression or transcoding processes are incorrectly processed by the compression encoder/transcoder. Another example is that the clock on the broadcast automation system is only accurate to the nearest second—and given that broadcast video can operate at frame rates in excess of 25 frames per second—the error in timing a metadata message can be several frames out. Let's suppose that the inserter inserts a SCTE 104 message 3 frames early for the start of an ad break. Detecting that the scene change based on video fingerprints associated with the actual start of the break occurs 3 frames after the SCTE 104 message means that there is a high probability that there has been an error for that particular message insertion and so the SCTE 104 message can be deleted and a replacement message inserted that identifies the frame where scene change occurs.

Therefore, a method used for communicating a video stream that contain video content comprising frames associated with metadata receives the video stream at a node. In one embodiment, the video stream is scanned for a first set of metadata associated with one or more frames. For example, a SCTE marker can contain the first metadata in the first set of metadata. The video stream is also scanned for a second set of metadata associated with the one or more frames that are associated with the first set of metadata. For example, a watermark can contains a second metadata in the second set of metadata. In order to synchronize metadata associated with specific frames at one or more source nodes with metadata associated with the same specific frames at one or more destination nodes, the association of the second set of metadata to the same one or more frames is modified as determined by association of the first set of metadata.

In still another embodiment, a method used for communicating a video stream that contain video content comprising frames associated with metadata receives the video stream at a node. The node is configured to scan the video stream for a first set of metadata associated with one or more frames. For example, a SCTE marker can contain a first metadata in the first set of metadata. A second set of metadata associated to the same one or more frames is then inserted as determined by association of the first set of metadata. The insertion synchronizes metadata associated with specific frames at one or more source nodes with metadata associated with the same specific frames at one or more destination nodes.

As stated above, the metadata or markers do not need to be carried in-band with the stream. The metadata can be delivered out-of-band to a downstream processing point, for example, during ad or close caption insertion, before the video itself arrives. This is because very small amount out-of-band metadata is transmitted and not processed which means the propagation delay will be shorter compared to the video during distribution which is often delayed a number of seconds due to video processing and transcoding in distribution systems. Therefore, temporal fingerprinting for scene change detection can be used as long as the processing and propagation delay of the video is longer than the propagation time of the scene change detection as reflected in metadata. In this way, errors in metadata timing assertions can be corrected without adding any additional delay to the video. This is a very significant additional benefit especially for live sports and news. The mechanism works for file-based workflows as well.

The invention claimed is:

1. A method used for transmitting a video stream that contains video content from one or more source nodes to one or more destination nodes, wherein the video content comprises consecutive frames, the method comprising:
   receiving the video stream at the one or more source nodes;
   associating one or more first metadata with one or more specific frames of the video content at one or more source nodes, the one or more first metadata including a first metadata associated with a specific frame at the one or more source nodes;
   associating one or more second metadata with the one or more specific frames at the one or more source nodes, wherein the one or more second metadata includes a second metadata associated with the same specific frame that is associated with the first metadata;
   associating the second metadata with the first metadata to conveys information used for synchronization of the first metadata at the one or more source nodes with the same specific frame at the one or more destination nodes; and
   transmitting the video stream, including the first metadata and the second metadata from the one or more source nodes to the one or more destination nodes.

2. The method of claim 1, further including
   scanning the transmitted video stream for the first metadata and the second metadata at the one or more destination nodes; and
   modifying the association of the second metadata with the first set of metadata, wherein the modification synchronizes metadata associated with specific frames at one or more source nodes with metadata associated with the same specific frames at one or more destination nodes.

* * * * *